US007230519B2

(12) United States Patent
Coughlin et al.

(10) Patent No.: US 7,230,519 B2
(45) Date of Patent: Jun. 12, 2007

(54) RFID TAG AND METHOD OF USER VERIFICATION

(75) Inventors: Michael E. Coughlin, Mission Hills, KS (US); Bernhard P. Knutsen, Overland Park, KS (US); David E. Schloemer, Mission, KS (US)

(73) Assignee: Scriptpro LLC, Mission, KS (US)

( * ) Notice: Subject to any disclaimer, the term of this patent is extended or adjusted under 35 U.S.C. 154(b) by 394 days.

(21) Appl. No.: 10/869,595

(22) Filed: Jun. 16, 2004

(65) Prior Publication Data

US 2004/0257202 A1 Dec. 23, 2004

Related U.S. Application Data

(60) Provisional application No. 60/484,495, filed on Jul. 2, 2003, provisional application No. 60/483,012, filed on Jun. 26, 2003, provisional application No. 60/479,752, filed on Jun. 19, 2003.

(51) Int. Cl.
*G05B 19/00* (2006.01)
*G06F 7/00* (2006.01)
*G08B 29/00* (2006.01)
*H04B 1/00* (2006.01)
*H04Q 1/00* (2006.01)

(52) U.S. Cl. .................. 340/5.82; 340/5.83; 340/5.52; 382/115

(58) Field of Classification Search ...... 340/5.82–5.83, 340/5.52–5.53, 5.61, 10.42; 348/77; 382/115–127; 396/14–18; 902/3; 235/492
See application file for complete search history.

(56) References Cited

U.S. PATENT DOCUMENTS 341,045 A 11/1886 Igel et al.

(Continued)

FOREIGN PATENT DOCUMENTS

AU 199676775 5/1997

(Continued)

OTHER PUBLICATIONS

Guerra, Lawrence E.; U.S. Appl. No 10/896,477, filed Jul. 22, 2004; Fork Based Transport Storage System for Pharmaceutical Unit.

(Continued)

*Primary Examiner*—Brian Zimmerman
*Assistant Examiner*—Nam Nguyen
(74) *Attorney, Agent, or Firm*—Hovey Williams LLP

(57) ABSTRACT

An identification tag (100) facilitates use of a secure computer system (300). The tag (100) is adapted to be worn on a user's wrist and includes an identification and registration circuit (102) that includes an identification component (106), an affiliation component (110), and a light-emitting diode (112). The computer system includes an RF identification tag registration device (302) operable to acquire user physical information and communicate the physical information to a computer (202), wherein the computer verifies that a valid user is wearing the tag (100). The identification and registration device (302) ensures that the physical information communicated to the computer pertains to the user wearing the tag by comparing pulse signals acquired from the user's hand and wrist as the device (302) is acquiring physical information. The computer (202) uses the identification information and the affiliation information to log the user into and out of the system (300), and to associate the identification information with a particular user.

40 Claims, 12 Drawing Sheets

U.S. PATENT DOCUMENTS

| | | |
|---|---|---|
| 1,128,561 A | 2/1915 | Webendorfer |
| 2,088,038 A | 7/1937 | Scott et al. |
| 2,137,501 A | 11/1938 | Myers |
| 2,178,000 A | 10/1939 | Siehrs |
| 2,348,927 A | 5/1944 | Runsvold et al. |
| 2,690,856 A | 10/1954 | Trondle |
| 2,781,947 A | 2/1957 | Webster et al. |
| 2,929,532 A | 3/1960 | Tonelli |
| 3,045,864 A | 7/1962 | Hurst et al. |
| 3,069,654 A | 12/1962 | Hough |
| 3,166,177 A | 1/1965 | Laverty |
| 3,193,196 A | 7/1965 | Merrill et al. |
| 3,206,062 A | 9/1965 | Rappaport |
| 3,215,310 A | 11/1965 | Hurst et al. |
| 3,277,998 A | 10/1966 | Medoff |
| 3,368,713 A | 2/1968 | Hurst et al. |
| 3,400,857 A | 9/1968 | Schubert |
| 3,603,327 A | 9/1971 | Buchholz et al. |
| 3,677,437 A | 7/1972 | Haigler |
| 3,692,211 A | 9/1972 | Flubacker |
| 3,719,288 A | 3/1973 | Schmitt et al. |
| 3,746,211 A | 7/1973 | Burgess, Jr. |
| 3,782,590 A | 1/1974 | Apfel |
| 3,823,844 A | 7/1974 | Linkemer et al. |
| 3,837,139 A | 9/1974 | Roseberg |
| 3,871,156 A | 3/1975 | Koening et al. |
| 3,885,702 A | 5/1975 | Joslin et al. |
| 3,917,045 A | 11/1975 | Williams et al. |
| 3,921,196 A | 11/1975 | Patterson |
| 3,985,264 A | 10/1976 | Shaw et al. |
| 3,997,063 A | 12/1976 | Adams et al. |
| 4,013,192 A | 3/1977 | Pillon |
| 4,018,358 A | 4/1977 | Johnson et al. |
| 4,247,019 A | 1/1981 | Lerner |
| 4,264,396 A | 4/1981 | Stewart |
| 4,284,301 A | 8/1981 | Geiger et al. |
| 4,386,860 A | 6/1983 | Price et al. |
| 4,468,277 A | 8/1984 | Kontz |
| 4,476,381 A | 10/1984 | Rubin |
| 4,546,901 A | 10/1985 | Buttarazzi |
| 4,615,350 A | 10/1986 | Boudville |
| 4,660,824 A | 4/1987 | Hermkens et al. |
| 4,714,515 A | 12/1987 | Hoffmann |
| 4,753,473 A | 6/1988 | Arnett |
| 4,787,803 A | 11/1988 | van Elten et al. |
| 4,803,487 A | 2/1989 | Willard et al. |
| 4,810,230 A | 3/1989 | Shirasawa |
| 4,811,764 A | 3/1989 | McLaughlin |
| 4,835,372 A | 5/1989 | Gombrich et al. |
| 4,851,072 A | 7/1989 | Kontz |
| 4,857,716 A | 8/1989 | Gombrich et al. |
| 4,868,409 A | 9/1989 | Tanaka et al. |
| 4,869,394 A | 9/1989 | Hurst |
| 4,872,803 A | 10/1989 | Asakawa |
| 4,902,263 A | 2/1990 | Ito et al. |
| 4,918,604 A | 4/1990 | Baum |
| 4,954,817 A | 9/1990 | Levine |
| 4,958,280 A | 9/1990 | Pauly et al. |
| 5,007,085 A | 4/1991 | Greanias et al. |
| 5,033,785 A | 7/1991 | Woolley, Jr. |
| 5,082,268 A | 1/1992 | Santoro |
| 5,194,857 A | 3/1993 | Gomez |
| 5,208,762 A | 5/1993 | Charhut et al. |
| 5,323,677 A | 6/1994 | Knutson |
| 5,332,275 A | 7/1994 | Conway et al. |
| 5,335,664 A | 8/1994 | Nagashima |
| 5,337,919 A | 8/1994 | Spaulding et al. |
| 5,348,061 A | 9/1994 | Riley et al. |
| 5,401,059 A | 3/1995 | Ferrario |
| 5,453,759 A | 9/1995 | Seebach |
| 5,463,839 A | 11/1995 | Stange et al. |
| 5,481,265 A * | 1/1996 | Russell .................. 341/22 |
| 5,493,805 A | 2/1996 | Penuela et al. |
| 5,512,879 A | 4/1996 | Stokes |
| 5,562,232 A | 10/1996 | Pearson |
| 5,597,995 A | 1/1997 | Williams et al. |
| 5,615,277 A * | 3/1997 | Hoffman .................. 382/115 |
| 5,621,384 A | 4/1997 | Crimmins et al. |
| 5,629,981 A | 5/1997 | Nerlikar |
| 5,671,592 A | 9/1997 | Yuyama et al. |
| 5,682,032 A | 10/1997 | Philipp |
| 5,700,998 A | 12/1997 | Palti |
| 5,706,026 A | 1/1998 | Kent et al. |
| 5,713,485 A | 2/1998 | Liff et al. |
| 5,713,487 A | 2/1998 | Coughlin |
| 5,718,525 A | 2/1998 | Bruhnke et al. |
| 5,762,235 A | 6/1998 | Coughlin |
| 5,771,657 A | 6/1998 | Lasher et al. |
| 5,781,511 A | 7/1998 | Yasukawa et al. |
| 5,797,515 A | 8/1998 | Liff et al. |
| 5,798,020 A | 8/1998 | Coughlin et al. |
| 5,812,410 A | 9/1998 | Lion et al. |
| 5,832,296 A | 11/1998 | Wang et al. |
| 5,845,264 A | 12/1998 | Nellhaus |
| 5,860,563 A | 1/1999 | Guerra et al. |
| 5,873,488 A | 2/1999 | Guerra |
| 5,883,370 A | 3/1999 | Walker et al. |
| 5,884,806 A | 3/1999 | Boyer et al. |
| 5,897,024 A | 4/1999 | Coughlin et al. |
| 5,903,225 A | 5/1999 | Schmitt et al. |
| 5,907,493 A | 5/1999 | Boyer et al. |
| 5,959,530 A | 9/1999 | Lupien, Jr. et al. |
| 5,963,453 A | 10/1999 | East |
| 6,006,946 A | 12/1999 | Williams et al. |
| D418,494 S | 1/2000 | Robb |
| 6,036,017 A | 3/2000 | Bayliss, IV |
| 6,036,812 A | 3/2000 | Williams et al. |
| 6,039,251 A | 3/2000 | Holowko et al. |
| 6,047,301 A * | 4/2000 | Bjorklund et al. .......... 708/139 |
| 6,070,140 A | 5/2000 | Tran |
| 6,075,189 A | 6/2000 | Robb |
| 6,085,938 A | 7/2000 | Coughlin |
| 6,119,737 A | 9/2000 | Yuyama et al. |
| 6,155,485 A | 12/2000 | Coughlin et al. |
| 6,161,721 A | 12/2000 | Kudera et al. |
| 6,193,153 B1 * | 2/2001 | Lambert .................. 235/380 |
| 6,206,590 B1 | 3/2001 | Thomas et al. |
| D440,570 S | 4/2001 | Schneider |
| 6,225,988 B1 | 5/2001 | Robb |
| 6,249,277 B1 | 6/2001 | Varveris |
| 6,256,402 B1 * | 7/2001 | Terao .................. 382/125 |
| 6,310,542 B1 | 10/2001 | Gehlot |
| 6,318,630 B1 | 11/2001 | Coughlin et al. |
| 6,320,570 B2 | 11/2001 | Robb |
| 6,343,711 B1 | 2/2002 | Coughlin |
| 6,346,886 B1 | 2/2002 | De La Huerga |
| D458,933 S | 6/2002 | Schneider |
| 6,421,584 B1 | 7/2002 | Norberg et al. |
| 6,477,442 B1 | 11/2002 | Valerino, Sr. |
| 6,478,185 B2 | 11/2002 | Kodama et al. |
| 6,526,158 B1 | 2/2003 | Goldberg |
| 6,533,480 B2 | 3/2003 | Schneider |
| 6,539,101 B1 * | 3/2003 | Black .................. 382/124 |
| 6,564,104 B2 | 5/2003 | Nelson et al. |
| 6,574,580 B2 | 6/2003 | Hamilton |
| 6,575,596 B2 | 6/2003 | Butt |
| 6,578,734 B1 | 6/2003 | Coughlin |
| 6,587,090 B1 | 7/2003 | Jarra |
| 6,592,005 B1 | 7/2003 | Coughlin et al. |
| 6,600,418 B2 | 7/2003 | Francis et al. |
| 6,624,739 B1 | 9/2003 | Stobbe |
| 6,636,620 B1 * | 10/2003 | Hoshino .................. 382/124 |
| 6,692,211 B2 | 2/2004 | Yuyama et al. |
| 6,695,207 B1 | 2/2004 | Norris, Jr. |

| | | | |
|---|---|---|---|
| 6,703,918 B1 | 3/2004 | Kita | |
| 6,720,948 B2* | 4/2004 | Martinez | 345/156 |
| 6,724,690 B1 | 4/2004 | Endo et al. | |
| 6,747,564 B1* | 6/2004 | Mimura et al. | 340/825.6 |
| 6,774,796 B2 | 8/2004 | Smith | |
| 6,944,768 B2* | 9/2005 | Siegel et al. | 713/186 |
| 7,069,444 B2* | 6/2006 | Lowensohn et al. | 713/185 |
| 2003/0142588 A1 | 7/2003 | Kawatahara | |
| 2003/0174049 A1* | 9/2003 | Beigel et al. | 340/10.42 |

FOREIGN PATENT DOCUMENTS

| | | |
|---|---|---|
| DE | 4235047 | 4/1994 |
| EP | 282785 A | 9/1988 |
| EP | 0471530 | 12/1991 |
| EP | 0827733 | 8/1997 |
| EP | 0924676 | 10/1998 |
| FR | 1449591 | 8/1966 |
| GP | 2109137 | 5/1983 |
| JP | 53145260 | 12/1978 |
| JP | 0043743 | 3/1984 |
| JP | 3031965 | 2/1991 |
| JP | 3240602 | 10/1991 |
| JP | 4174061 | 6/1992 |
| JP | 6127635 | 5/1993 |
| JP | 6315521 | 11/1994 |
| JP | 7187165 | 7/1995 |
| JP | 8007058 | 1/1996 |
| JP | 8115376 | 5/1996 |
| JP | 9034964 | 2/1997 |
| JP | 9202301 | 8/1997 |
| JP | 9231342 | 9/1997 |
| JP | 09259344 A | 10/1997 |
| JP | 11296727 A | 10/1997 |
| JP | 10059336 | 3/1998 |
| SD | SU918086 | 4/1982 |
| WO | 9422580 | 10/1994 |
| WO | 9529455 | 11/1995 |
| WO | 9809598 | 3/1998 |

OTHER PUBLICATIONS

Coughlin, Michael E.; U.S. Appl. No. 09/457,286, filed Dec. 8, 1999; Automatic Dispensing System for Unit Medicament Packages.

Knutsen, Bernhard P.; U.S. Appl. No. 10/869,595, filed Jun. 16, 2004; RFID Tag and Method of User Verification.

Fred Levit, Daniel Garside; Computer-Assisted Prescription Writing; Dec. 30, 1976.

National Institutes of Health; Prescription-Writing with a PC; Jun. 10, 2003.

Packaging Week Interpak; Integrated Cartoning and Labeling System; Jul. 1996.

Roerig, CS; Assembly Automation; Automatic Pharmaceutical Inspection; 1993.

Alton Rosemary; Assembly Automation; Verification of Automated Pack Assembly; 1993.

Chain Store Age Executive; Longs Drug Stores' Systems Prescription; Dec. 1996.

Ukens, Carol; Drug Topics; Rx Description of Product Label Aids Accuracy.

McHugh, James A.; Phillips, Alexander J.; Computers in Healthcare; Managed-Care Pharmacy: An Integrated MIS Approach.

JICST; Development of a Printing System of Drug Envelope Labels with Personal Computer and Experience of its Usage.

Journal of Public Policy & Marketing: Comprehension Testing for OTC Drug Labels; Goals, Methods, Target Population, and Testing Environment.

Kalsher, Michael J.; Proceedings of the Human Factors and Ergonomics Society; Enhancing the Perceived Readability of Pharmaceutical Container Labels and Warnings: the Use of Alternative Designs and Pictorials.

Fluid Phase Equilbria; Pharmaceutical Container Labels: Enhancing Preference Perceptions with Alternative Designs and Pictorials.

Department of Clinical Pharmacy; A Survey of Prescription Label Preferences Among Community Pharmacy Patrons.

American Journal of Hospital Pharmacy; Effect of Call-In Prescription Refill System on Workload in an Outpatient Pharmacy.

Department of Mathematical Statistics and Operation Research; Retail Pharmacy Activities and Their Automation by Bar Code Recorder, Tablet Counter and Remote Computer.

Bohsei Pharmacy Co. Ltd.; Computerized Prescription Checking System.

Business Forms, Labels *& Systems; Label/Tag.

Converting Magazine; A Prescription for Supplying the Pharmaceutical Industry.

Ursula Jones; How to Get More from your Label.

American Society of Consultant Pharmacist; White Paper on Automation in Pharmacy.

* cited by examiner

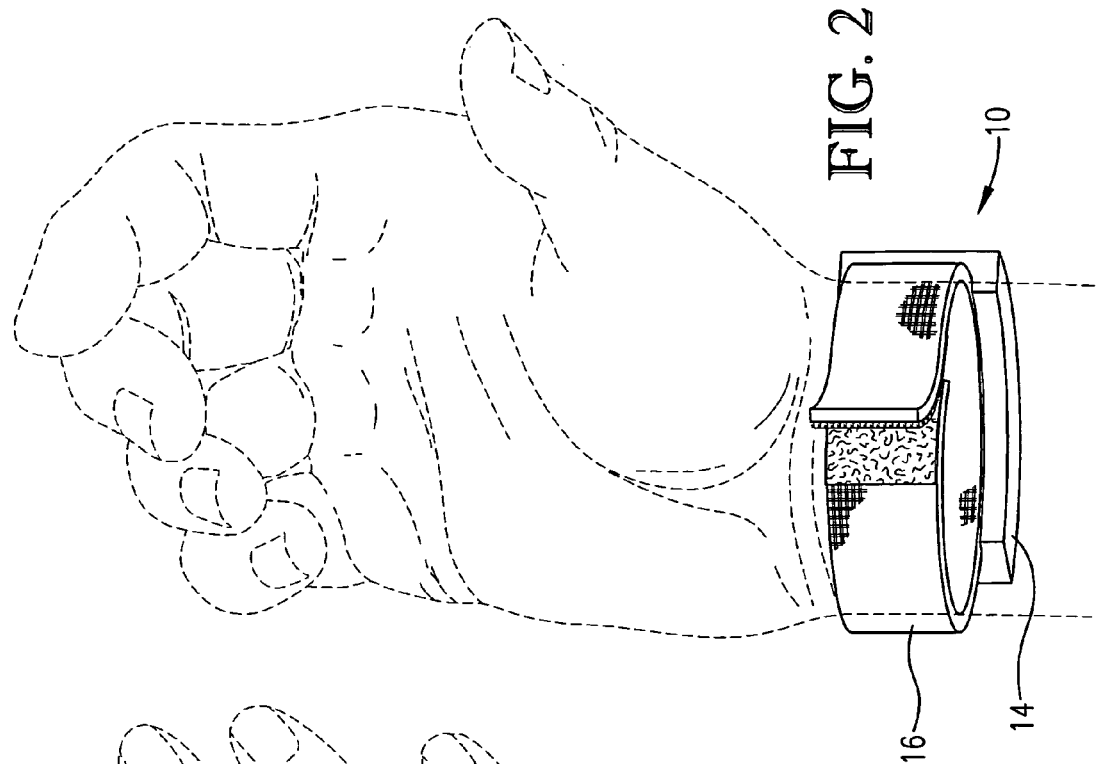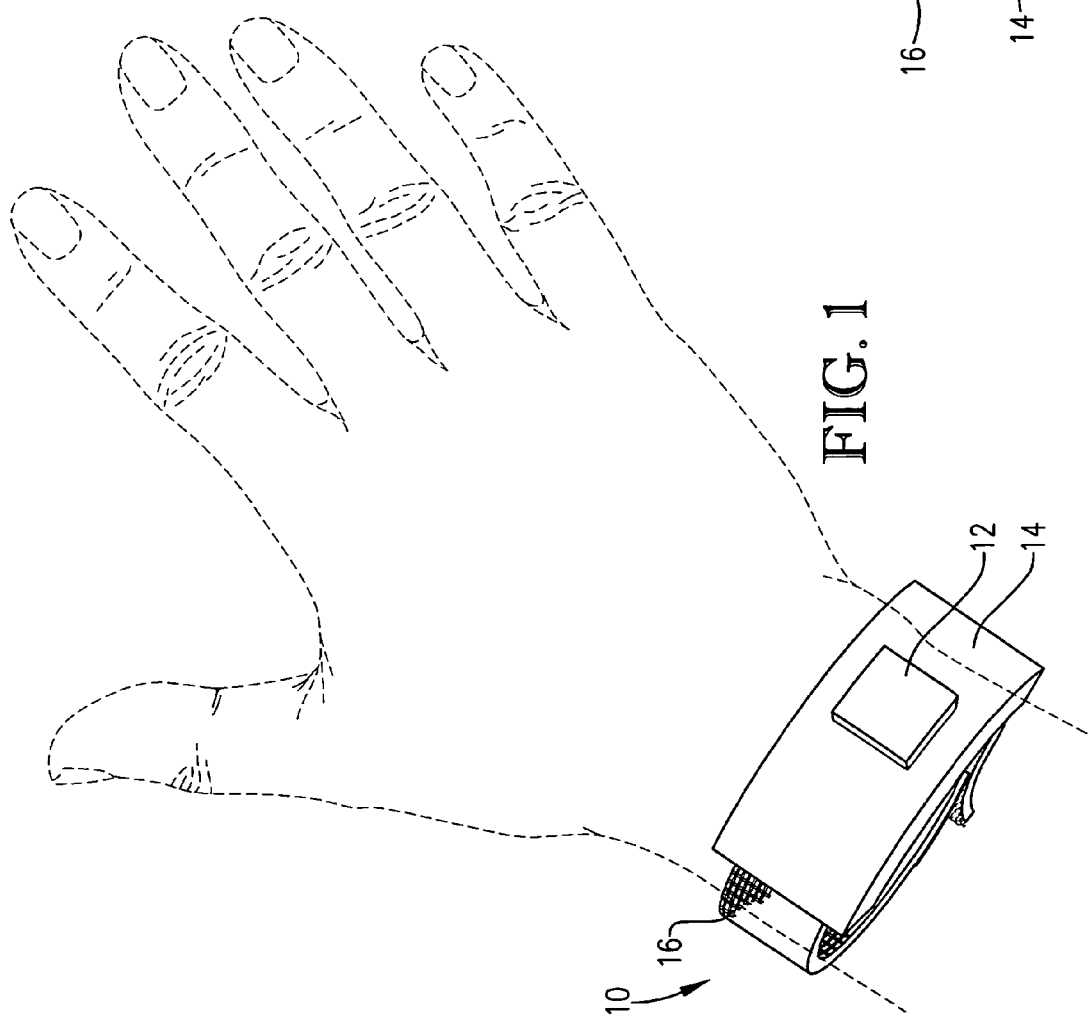

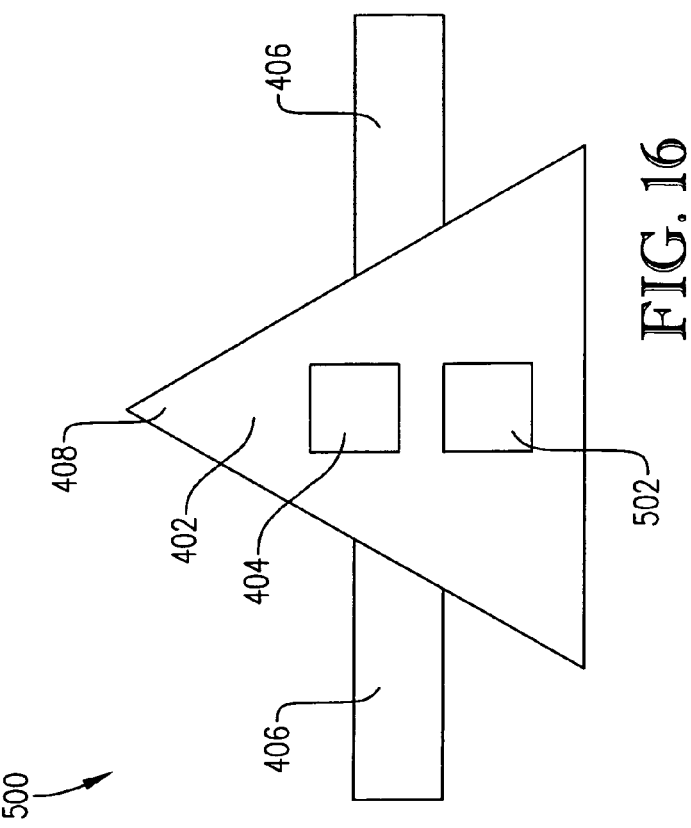
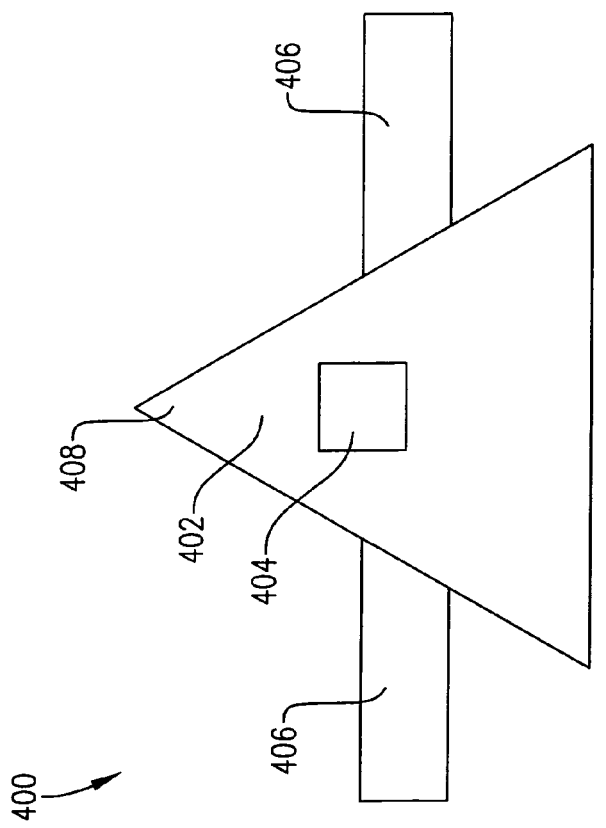

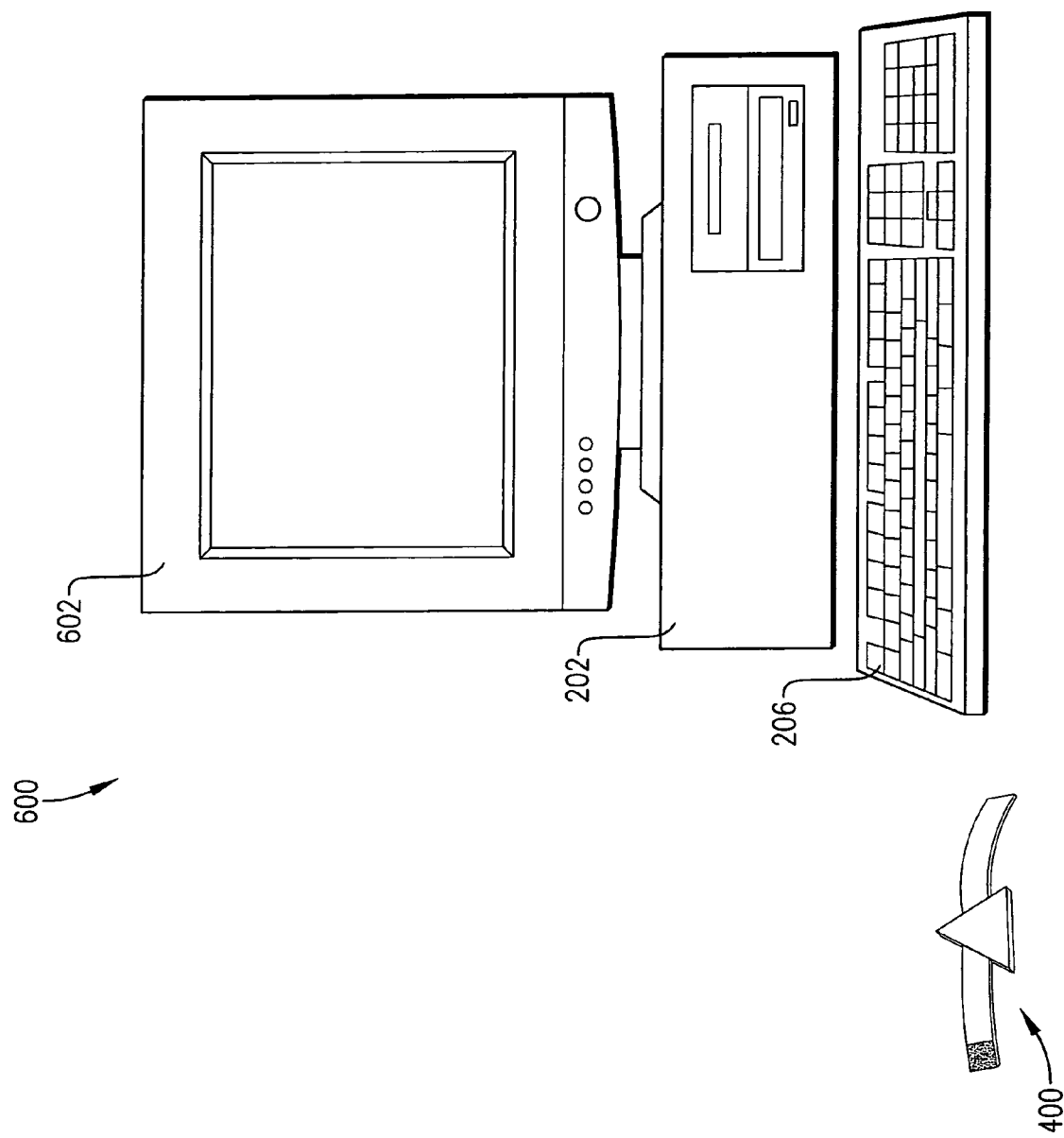

RFID TAG AND METHOD OF USER VERIFICATION

RELATED APPLICATIONS

The present application is a nonprovisional patent application and claims priority benefit, with regard to all common subject matter, of earlier-filed U.S. provisional patent applications entitled "SMART TOUCH SCREEN POINTER," Ser. No. 60/479,752, filed Jun. 19, 2003; "USER VERIFICATION FOR SMART TOUCH SCREEN POINTER," Ser. No. 60/483,012, filed Jun. 26, 2003; and "SMART TOUCH SCREEN POINTER," Ser. No. 60/484,495, filed Jul. 2, 2003. The identified earlier-filed provisional applications are hereby incorporated by reference into the present application. This application also relates to U.S. application Ser. No. 10/869,596, filed Jun. 6, 2004, is abandoned, and entitled "RFID TAG AND METHOD OF USER VERIFICATION"; and U.S. application Ser. No. 10/869,597, filed Jun. 6, 2004, is U.S. Pat. No.: 7,048,183 and entitled "RFID TAG AND METHOD OF USER VERIFICATION," both of which are herein incorporated by reference.

BACKGROUND OF THE INVENTION

1. Field of the Invention

The present invention relates to human interaction with secure computer systems. More particularly, the present invention relates to a tag worn on a user's wrist, fingertip, or other body part that is operable to communicate information to a computer that allows the computer to identify the tag, associate the tag with the user, and grant or deny the user access to the computer.

2. Description of Prior Art

Computer systems, pharmacy automation systems, and other systems that contain sensitive information often employ security measures, such as requiring users to log into and out of the system. Operators of such systems, however, often spend only a portion of their time at the systems. Engineers, for example, may spend part of their time at their computer using design software and reading specifications, and part of their time in a laboratory or in the field building and/or testing a design. To ensure complete security, a user may need to log out of the system each time he or she leaves, requiring a new log in upon returning. This can become time consuming, and may open the door to security breaches if the user forgets to log out.

Also, in many environments, such as in pharmaceutical prescription filling environments, restaurants, and other patient or customer service environments, multiple users share the same computer. In those environments, no specific user is logged into the system, and it becomes necessary to identify, authorize and record the user for every transaction that is entered. This often necessitates repeated input of user identification numbers or scanning of user badges. Use of identification numbers and badges is not only inconvenient, but also introduces the risk of an unauthorized user obtaining an identification number and/or badge and accessing the system, thus compromising security.

Modern computer and pharmacy automation systems also often employ non-traditional interfaces, such as touch screens. People working with computer touch screens or similar interfaces often desire to use mechanical pointers rather than their fingers to operate the interfaces. A pointer facilitates precise touch screen operation and eliminates the soiling effect of repeatedly touching the screen with a finger.

Touch screen pointers come in many shapes, sizes and varieties, including those that a user holds in his or her hand like a pen, and those that are adapted to be secured to the user's hand, such as a finger-mountable pointer secured to the tip of the user's finger. Securing a pointer to the tip of a finger eliminates the need for the user to repeatedly pick up the pointer to use it, and enables the user to interact with the screen in a natural and comfortable way, in much the same manner as he or she would use a finger to operate the touch screen. Unfortunately, fingertip pointers often impede other uses of the hand or finger, such as typing or writing.

The evolution of computers has created special demands for screen navigation tools that are not adequately met by current touch screen pointers. Computer systems are becoming commonplace in an increasing number and variety of settings, and often accommodate and/or require multiple forms of user input. Therefore, users often need to use a touch screen pointer in addition to other forms of input, such as a keyboard, keypad, mouse or bar code scanner; and while using their hands for other tasks, such as while filling pharmaceutical prescriptions, working on an assembly line or driving a vehicle. Furthermore, portable computing devices, such as notebook computers and personal digital assistants (PDAs), present a unique challenge because their limited size and resources prohibit use of the more robust user input devices available to stationary computer systems. To facilitate screen navigation, for example, PDAs often include a hand-held pointer, while notebook computers may include touch pads. Unfortunately, traditional pointers are not well adapted to meet the needs of these situations, as hand-held pointers can be prohibitively cumbersome and inefficient and finger-mounted pointers can impede use of the hand.

Due to the above-mentioned and other problems and disadvantages in the art, a need exists for improved computer security devices that automatically log a user into and out of a secured system and allow the system to automatically identify the user, control what functions he or she is allowed to perform, and record the performance of such functions by the authorized individuals. A need also exists for such a system that associates a particular person with a security device to eliminate the risk of an unauthorized user acquiring and using a security device to gain access to the system. A need also exists for input devices adapted to be secured to a user's finger or other body part in a manner that automatically and positively identifies the user to the computer system and which also facilitate the use of a touch screen without impeding use of the body part.

SUMMARY OF THE INVENTION

The present invention overcomes the above-described and other problems and disadvantages of the prior art. One embodiment of the invention provides an identification tag adapted to facilitate use of a computer system, pharmacy automation system, or other secured system. The tag is adapted to fit on a user's wrist in a manner that does not impede use of the user's hand. The identification tag includes an RF identification (RFID) component operable to communicate identification information to a computer, which then uses the information, for example, to log the user into and out of the system.

The identification tag also comprises a housing, and an attachment component. The RFID component is adapted to be embedded in or attached to the housing and includes a passive RF circuit operable to transmit identification information via a radio signal in response to an interrogation signal. The identification information may include a name or an identification number. The housing is adapted to enclose, contain and protect the RFID component. The attachment component is adapted to secure, retain and maintain the housing in close physical association with the user.

In another embodiment of the invention, an identification tag is further provided which comprises an affiliation component. The affiliation component is operable to detect if the tag has been removed from a user by, for example, measuring a capacitance associated with a surface of the tag, wherein the surface is in contact with the user when the tag is secured to the user. The capacitance may indicate whether the tag is secured to a user if, for example, the capacitance is significantly higher when the tag is secured to the user. The affiliation component is further operable to communicate affiliation information that indicates whether the tag is secured to a user.

Both of the above-described tags may be used to provide secured access to a computer system, pharmacy automation system, or other secured system, which includes a computer, a display, and a keyboard. The computer is operable to automatically log a user into and out of the system using the identification information from the tag. In use, a user wears the tag on a wrist or other body part while operating the computer. When the user approaches the computer, the computer interrogates the identification component and detects the identification information from the identification component. Once the computer detects the identification information it validates the information by determining if the information contains a valid identification. When the computer logs a user into the system, the user may then interact with the computer and access otherwise protected files and data. While the user is logged into the system, the computer may periodically interrogate the identification component to authenticate the user. The frequency of interrogations may vary depending on the type of application the user is running on the computer.

In another embodiment, a registration device may be provided to further increase the functionality of the system by acquiring user physical information and communicating the information to the computer. The physical information is unique to the user and preferably relates to a physical attribute of the user such as, for example, a fingerprint. The registration device acquires a user's fingerprint information and tag identification information, and confirms that the tag is worn by the person submitting the fingerprint information by comparing pulse information from the user's finger with pulse information from the user's arm.

In use, when a computer of the secured system validates the identification information, it may further prompt the user to submit user information via the registration device by, for example, requiring the user to place a finger on a fingerprint scanner. The computer then validates the user information by matching the fingerprint information from the registration device with fingerprint information stored in a memory. The computer is operable to associate the identification information with the user information by, for example, storing both in a memory. Associating the identification information with the user information allows the computer to authenticate the user using identification information, as well as verify that the identification information is associated with a valid user. This reduces the risk of an unauthorized user accessing the system by illicitly acquiring an identification tag. The affiliation component of the tag may periodically communicate affiliation information to the system computer, allowing the computer to confirm or abandon the association. If the computer detects a valid identification but abandons an association, it may log the user out of the system, or may prompt the user to submit user information to create a new association.

Another embodiment of the present invention includes a pointer comprising a stylus, the identification component mentioned above, and an attachment component. The stylus is adapted to assist the user in communicating with a computer via an interactive display, such as a touch screen or similar interface. The stylus is preferably triangle-shaped and is sized to fit substantially over a user's fingernail with a point of the triangle extending minimally over the tip of the user's finger.

The identification component is embedded in the stylus and is operable to store and to communicate identification information relating to the pointer and/or the user via a passive RF circuit. The identification component may include, for example, a read only memory (ROM) that is programmed with the identification information at the time the pointer is manufactured, or when the pointer is purchased by an end user.

The attachment component is adapted to secure the stylus to a user and in one embodiment includes a flexible strap adapted to wrap around the user's finger and be secured in place with a hook and loop fastener. The attachment component secures the stylus to the user's finger so that the stylus is located substantially over the user's fingernail, with a point of the stylus extending over the tip of the fingernail with minimal overhang. The attachment component does not impede use of the user's hand or finger when worn, and leaves exposed a fingerprintable portion of the user's fingertip.

The pointer may further include an affiliation component similar in form and function to the affiliation component described above. Furthermore, the pointer may be used as part of a computer system that may or may not make use of the affiliation component.

In use, a user wears the pointer on a finger or other body part while operating the computer. When the user approaches the computer, the computer interrogates the identification component and detects the identification information from the identification component. Once the computer detects the identification information it validates the information by determining if the information contains a valid identification. When the computer logs a user into the system, the user may use the pointer to interact with the computer via the display, may interact with the computer via the keyboard, or both. While the user is logged into the system, the computer may periodically interrogate the identification component to authenticate the user. The frequency of interrogations may vary depending on the type of application the user is running on the computer.

These and other important features of the present invention are more fully described in the section titled DETAILED DESCRIPTION OF PREFERRED EMBODIMENTS, below.

BRIEF DESCRIPTION OF THE DRAWINGS

FIG. 1 is a top view of an RF identification tag secured to a user's wrist according to a preferred embodiment of the present invention;

FIG. 2 is a bottom view of the tag of FIG. 1 secured to a user's wrist;

FIG. 15 is a schematic of components of the pointer of FIG. 12;

FIG. 16 is a schematic of components of another embodiment of the pointer of the present invention;

FIG. 17 is a perspective view of a computer system using the pointer of FIG. 12.

DETAILED DESCRIPTION OF PREFERRED EMBODIMENTS

Figure 3:
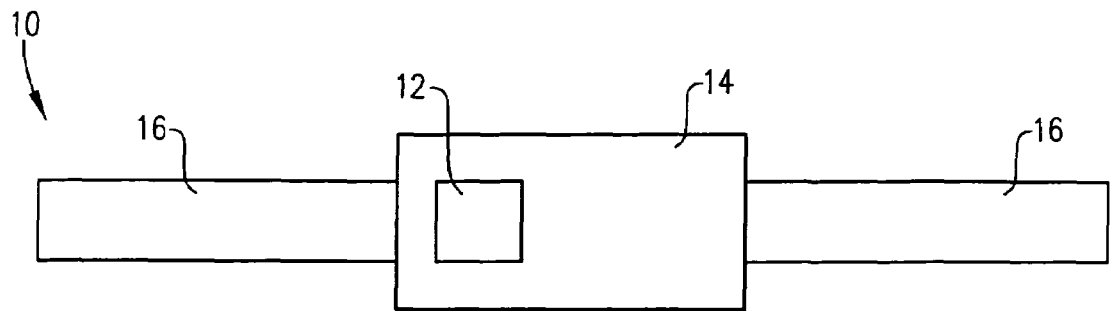
FIG. 3 is a schematic of components of the tag of FIG. 1.

Referring to FIGS. 1-3, an identification tag 10 is shown constructed in accordance with a preferred embodiment of the present invention. The tag 10 is adapted to facilitate use of a computer system by communicating identification information to a computer of the system, which may use the information, for example, to log the user into and out of the system. The tag 10 does not impede other user functions, such as typing or writing.

The identification tag 10 comprises an RF identification (RFID) component 12, a housing 14, and an attachment component 16. The identification component 12 is preferably adapted to be embedded in or attached to the housing 14. The identification component 12 may be any device operable to store and communicate identification information, such as a passive RFID tag or chip, as described below. The identification component 12 may include a memory element that is operable to receive and store the identification information, such as a read only memory (ROM), a programmable read only memory (PROM), or an erasable programmable read only memory (EPROM). A manufacturer may store the identification information in the identification component 12 by programming the ROM at the time the wrist tag 10 is manufactured, or an end user may program or reprogram the PROM or EPROM using, for example, an RF read/write apparatus.

The identification information may be unique to a user and/or unique to the identification tag 10 by containing, for example, an identification number of the user, an identification number of the tag 10, or a name of the user. Identification information unique to a user or tag 10 would be desirable, for example, where the system must recognize or record the identity of each user. Such a system may give each user access to only his or her data files and/or access to data files shared by all users of the system. Alternatively, the identification information may be unique to a class of users or tags 10. In such a system, the identification components 12 pertaining to each class would transmit identification information unique to their class, allowing a computer to distinguish between the various classes of users by detecting the identification information. For example, a first class of identification components 12 may correspond to engineers, a second class may correspond to accountants, and a third class may correspond to managers. The system could give the engineers access only to files relating to project designs, give the accountants access only to files relating to expenses and payroll, and give the managers access to all files in the system.

The identification component 12 preferably includes a passive RF circuit operable to transmit identification information via a radio signal in response to an interrogation signal. If the identification component 12 is used with a computer, for example, the computer may be operable to communicate an electromagnetic interrogation signal and detect a response from the RF circuit. Passive RF circuits have the advantage of being small and externally powered, allowing the circuit to be easily embedded in the housing 14 without a battery or other external power supply. Although described as a passive RF circuit, the identification component 12 may be an active RF circuit, and may be operable to communicate the identification information via other wireless means, such as, for example, infrared, ultrasonic or optical signals.

The housing 14 is adapted to enclose and contain the identification component 12 so as to protect and shield it from the hazards of use and of the environment. As such, the housing 14 is preferably constructed from a suitable lightweight and impact-resistant material such as, for example, plastic, nylon, aluminum, or any combination thereof. Though shown as being substantially rectangular, the housing 14 may take any suitable shape, including, for example, ergonomic shapes molded to substantially correspond to a portion of the user's body whereupon or against which the housing 14 is meant to rest.

The attachment component 16 is adapted to secure, retain and maintain the housing 14 in close physical association with the user and is preferably adjustable. In one embodiment, the attachment component 16 includes a flexible strap adapted to wrap around the user's wrist or arm, secured in place with a hook and loop fastener, such as the VELCRO® brand hook and loop fastener. The attachment component 16 preferably secures the housing 14 to the user's wrist so that the housing 14 is located on the top of the wrist when the user is typing, thus facilitating wireless communication between the identification component 12 and the computer while the user is working at the computer. The attachment component 16 preferably does not impede use of the user's hand or fingers when worn, allowing the user to type, use a pen, use a fingerprint scanner, talk on a telephone, wear a glove, and perform other tasks without removing the wrist tag 10. Wearing the tag 10 on the user's wrist allows the user to efficiently use a secure computer system by enabling the user to communicate his or her identity to the system without going through time consuming log-in screens or removing an identification badge or card from a pocket, wallet, or purse.

The attachment component 16 is not limited to a flexible strap but may include, for example, an elastic band or substantially rigid members that partially or completely encircle the user's wrist or arm. Also, the attachment component 16 may secure the housing 14 and the identification component 12 to various areas of the user's body or clothes, such as a wrist, arm, finger, shirt or glove. While the attachment component 16 and the housing 14 have been described separately, it will be appreciated that they may be integrally connected.

Figure 4:
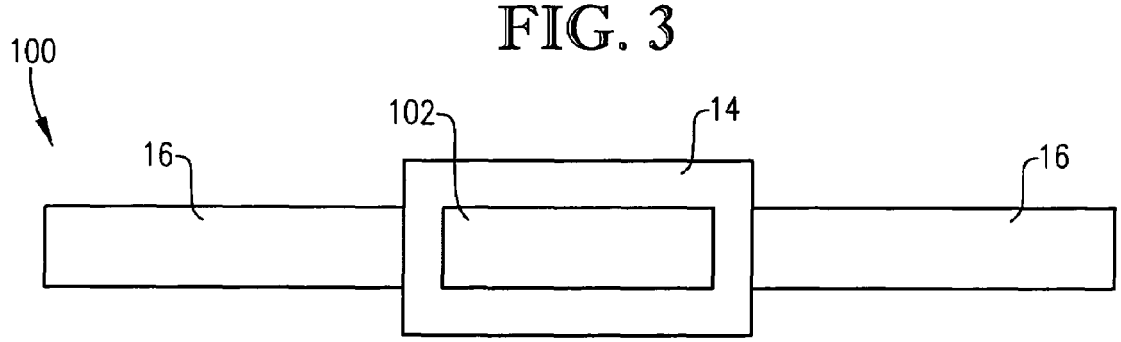
FIG. 4 is a schematic of components of an alternate embodiment of the RF identification tag of the present invention.
Figure 5:
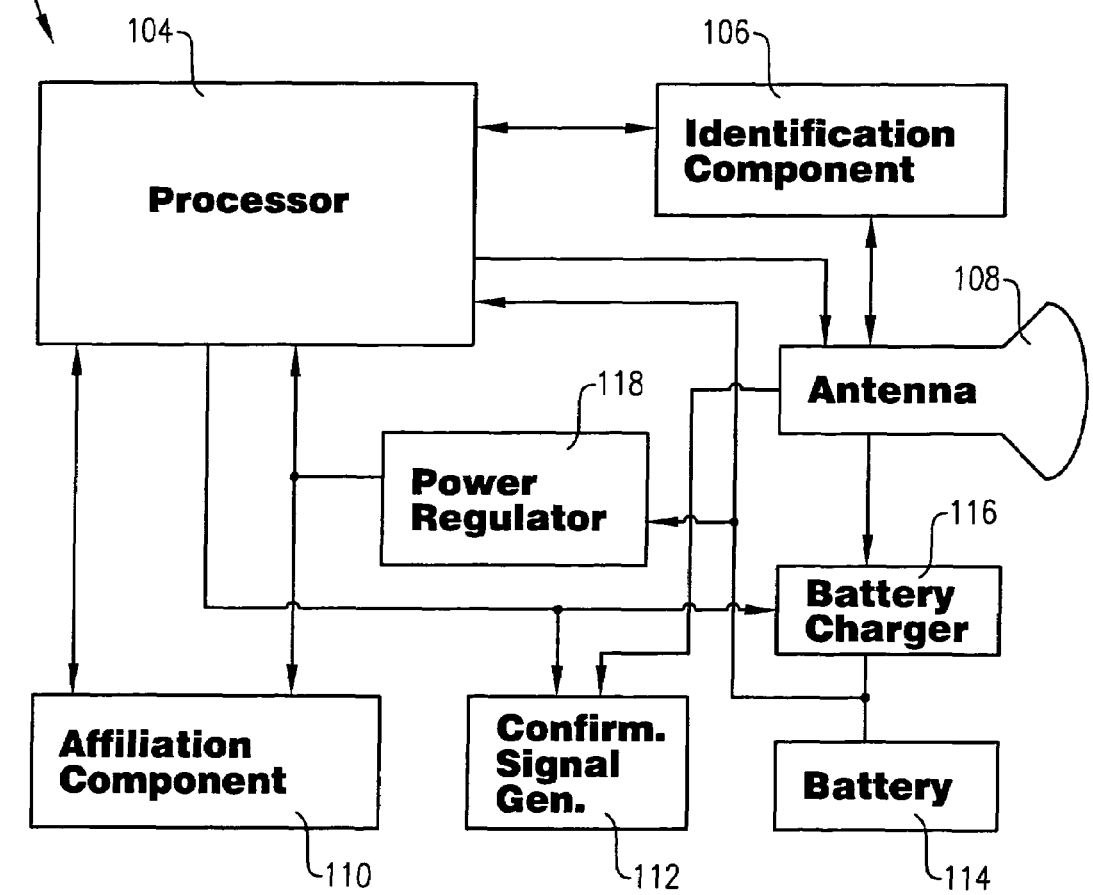
FIG. 5 is a schematic of components of an identification and registration circuit of the RF identification tag of FIG. 4.

Referring to FIG. 4, an identification tag 100 is shown constructed in accordance with an alternate embodiment of the present invention. The identification tag 100 is similar to tag 10, described above, except that the identification tag 100 includes a tag identification and registration circuit 102. Referring also to FIG. 5, the identification and registration circuit 102 includes a tag processor 104; an identification component 106; an antenna 108; an affiliation component 110; a confirmation signal generator 112; a battery 114; a battery charger 116; and a power regulator 118.

The tag processor generally controls the other components of the tag identification and registration circuit. The illustrated processor 104 is a general-purpose model digital computer processor commercially available. Alternatively, the processor may be an application-specific model custom made for use in the circuit 102. The processor 104 includes onboard memory and clock elements (not shown). The processor 104 receives information from the identification component 106, the affiliation component 110 and the battery charger 116. The processor 104 responds to the information by communicating control signals to activate and deactivate the identification component 106; to request information from the affiliation component 110 as well as to activate and deactivate it; and to activate and deactivate the battery charger 116. It will be appreciated that the control functions of the processor may be implemented by means other than the illustrated processor 104 such as, for example, with discrete logic chips including logic gates and memory elements.

The identification component 106 is similar to the identification component 12, described above, in that it is activated by an external interrogation signal received via the antenna 108 and communicates identification information in response to the signal. In contrast to the identification component 12, however, the identification component 106 communicates information to the processor 104 and is controlled by the processor 104. The processor 104 may disable the identification component 106, for example, to conserve power and prolong the life of the battery 114. Furthermore, the processor 104 may communicate specific identification information to the identification component 106, which the identification component 106 then communicates in response to the interrogation signal received by the antenna 108. The identification component 106 may communicate information to the processor 104 indicative, for example, of whether the identification component 106 has received an interrogation signal. Furthermore, the processor 104 may be programmed to disable the identification component 106 to preserve power such as, for example, when a signal received by the antenna 108 is used to recharge the battery 114.

The antenna generally receives wireless signals from an external source and communicates the signals to the various other components of the circuit. The illustrated antenna 108 is a patch antenna that receives wireless RF signals and communicates the signals to the identification component 106, the confirmation signal generator 112, and to the battery charger 116. These components derive both information and power from the RF signals. The battery charger 116 derives power from the signals, for example, while the identification component 106 derives information, such as interrogation information, from the signals. The antenna 108 is tuned to a frequency or band of frequencies used by the system.

The user affiliation component generally determines whether the identification tag is secured to a user and wirelessly communicates corresponding information to an external electronic device. The illustrated affiliation component 110 is operable to detect if the tag 100 is secured to a user and to communicate corresponding information to a computer to enable the computer to associate the tag 100 with a particular user, as described in greater detail below. The affiliation component 110 communicates information to the processor 104, which communicates the information to the antenna 108 for wireless communication to an external device. Alternatively, the affiliation component 110 may communicate the information directly to the antenna 108.

The affiliation component 110 may determine if the tag 10 is secured to a user by, for example, measuring a capacitance between two points of the housing 14, wherein a capacitance value is indicative of whether the housing 14 is in contact with the user's body. The affiliation component 202 may alternatively measure a temperature, sense a pressure, and sense moisture to determine if the tag 100 is secured to a user. The affiliation component 202 may also use any combination of these sensors to determine if the tag 100 is secured to a user. If capacitance is lost disrupted or lost entirely, for example, the processor 104 will not respond to interrogations by the computer until the tag has been re-registered.

The confirmation signal generator generally verifies the tag by communicating an electromagnetic signal in response to an external RF signal, thus allowing an external device to identify the tag. The illustrated confirmation signal generator 112 is an infrared light-emitting diode powered directly by the antenna 108, wherein the brightness of the generator 112 reflects the strength and pattern of the signal received by the antenna 108. For example, if the RF signal received by the antenna 108 has a certain magnitude and frequency, the confirmation signal will have a similar magnitude and frequency. An external device receiving and monitoring the confirmation signal could compare the signal communicate to the tag 100 with the signal received from the signal generator 112 to confirm the identity of the tag 100 and the presence of only one tag 100. As the magnitude and/or the frequency of the signal communicated to the tag 100 increases or decreases the corresponding confirmation signal generated by the confirmation signal generator changers accordingly. If a second tag is placed within a close proximity of the tag 100 so that there are two LEDs present, the device receiving the light signals will recognize that two light signals are present and will prevent further user verification.

The battery generally supplies power to the other components of the tag circuit and is recharged by the battery charger. The illustrated battery 114 is sufficiently small to fit within the tag 100, and therefore may be similar to a battery used in a watch, hearing aid, or similar small electronic device. The battery 114 is charged by the battery charger 116 when the charger 116 is activated by the processor 104. Thus, the battery 114 does not need to be replaced each time its power is drained, but is preferably accessible none-the-less to facilitate replacement at the end of the useful life of the battery, which may be, for example, after one thousand charges. It will be appreciated that battery may be any type of device capable of storing and delivering electrical power, including, for example, a capacitor.

The battery charger generally receives power from the antenna, converts the received power into a form that is receivable by the battery, and chargers or recharges the battery by delivering power to it. The illustrated battery charger 116 is controlled by the processor 104 to recharge the battery 114 when the processor 104 determines that the battery's supply of energy is sufficiently low to merit recharging and that the identification component 106 is supplying sufficient power to the battery charger 116 to allow it to recharge the battery 114. Thus, the battery 114 can be charged or recharged via a wireless signal and without the need to attach the tag 100 to another device. The battery charger 116 also delivers power to the other components of the circuit 102 while charging the battery, as illustrated in FIG. 5. Recharging a tag after a day of use may include removing the tag from the user's arm and placing it in a box or basket where wireless recharging signals are directed. It will be appreciated that this can greatly reduce the amount of time dedicated to recharging the tags, particularly where a large number of tags are used.

The battery charger 116 may be a circuit as simple as a voltage regulator circuit that supplies the battery 114 with a fixed voltage, a rectifier circuit that receives an alternating current signal from the identification component 106 and communicates a direct current signal to the battery 114, or a combination thereof. It will be appreciated that the battery charger may further be more sophisticated with complex internal circuitry.

The power regulator generally receives power from the battery charger and the battery, regulates the power, and delivers the power to other components of the tag circuit. The illustrated power regulator 118 includes capacitive and/or inductive circuits to prevent extreme and/or rapid changes in voltage and current from reaching the other components of the circuit 102. The power regulator 118 is particularly important to include in the circuit 102 where circuit power is derived alternately from the battery charger 116 and the battery 114, or where circuit power is derived directly from the antenna 108. In such situations power levels are likely to fluctuate significantly, and the power regulator 118 protects the circuit 102 from disruptions and surges in the flow of power.

The tag identification and registration circuit has been illustrated and described with reference to particular elements and components. It will be appreciated, however, that substitutions may be made that preserve the general functionality of the circuit and remain within the scope of the present invention. The components, for example, may be embedded in a single integrated circuit, or may be contained in separate circuits within a single identification tag or within separate identification tags.

Figure 6:
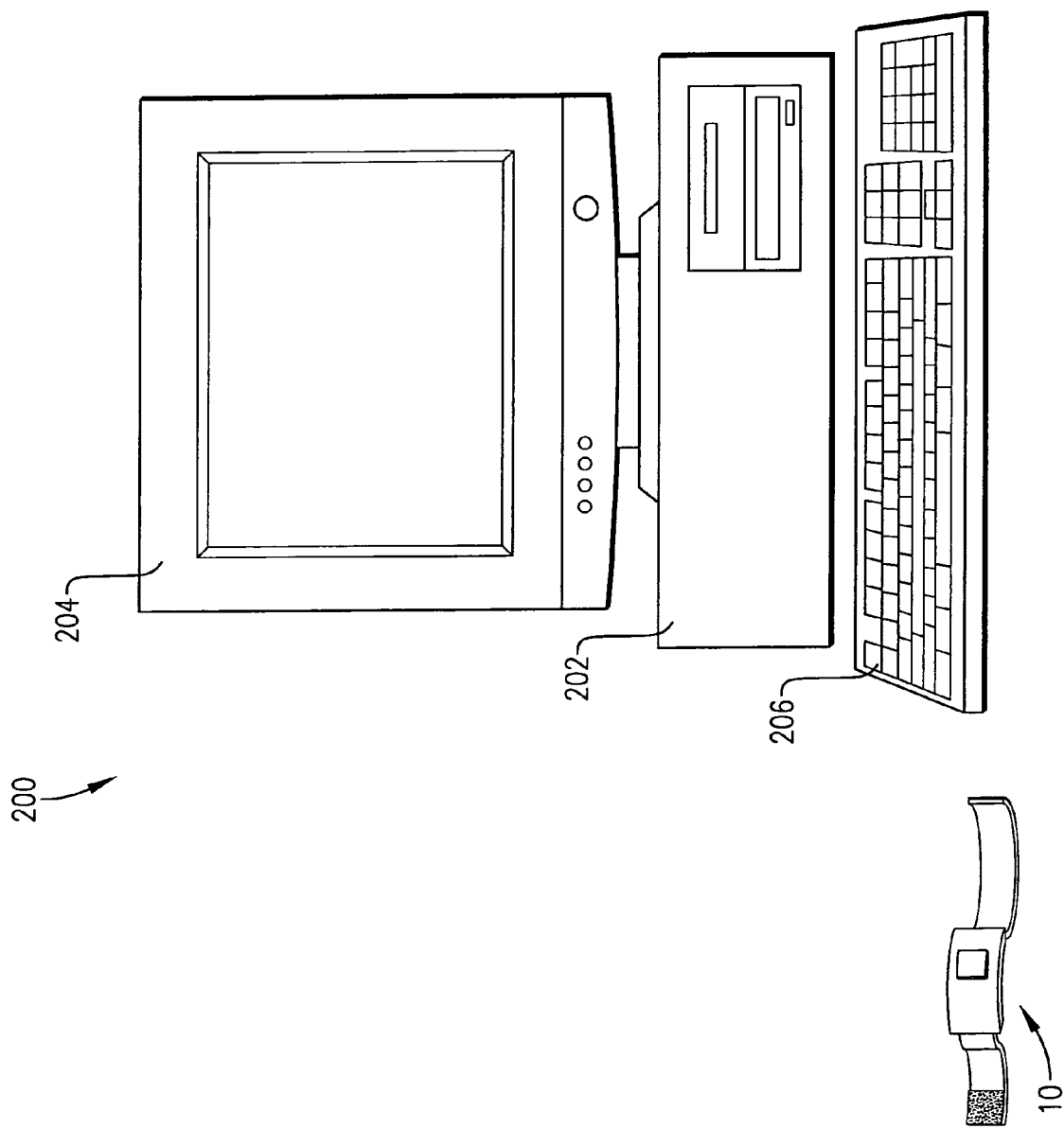
FIG. 6 is a perspective view of the RF identification tag of FIG. 1 used with another embodiment of the present invention.

Referring to FIG. 6, the identification tag 10 is preferably used to provide secured access to a computer system, pharmaceutical automation system, or other secured system 200 including a computer 202, a display 204, and a keyboard 206. The computer 202 is preferably a workstation connected to a computer network but also may be, for example, a stand-alone personal computer, a network terminal, or a portable computing device such as a personal digital assistant or a computer embedded in a vehicle. The computer 202 is operable to automatically log a user into and out of the system 200 using the identification information from the identification component 12 of the tag 10. The computer 202 may communicate with the identification component 12, for example, using an RF circuit operable to transmit an interrogation signal and detect an identification signal, wherein the RF circuit may be integral with or peripheral to the computer 202. The RF circuit may be, for example, embedded in the keyboard 206, the monitor 204, the computer 202, or other peripheral devices. While the computer 202 is shown with minimal peripheral components, the computer 202 may include any number of peripheral components or attachments in addition to those shown and described herein.

The display 204 is operable to display information generated by the computer 202 and may include, for example, a cathode ray tube or a liquid crystal display. The keyboard 206 is operable to allow the user to input text and other commands to the computer, and may be of a type that is well known in the art. The display 204 and the keyboard 206 may take any of a variety of forms. For example, if the computer 202 is embedded in a vehicle, the display 204 may include a small liquid crystal display (LCD) touch screen embedded in the vehicle's dash board, and the keyboard 206 may include only a few buttons located on the dash board or steering wheel.

In use, a user wears the identification tag 10 on a wrist while operating the computer 202. When the user approaches the computer 202, the computer 202 interrogates the identification component 12 by transmitting an RF signal detectable by the identification component 12. The computer 202 then detects the identification information transmitted from the identification component 12. Once the computer 202 detects the identification information it attempts to validate the information by determining if the information contains a valid identification. This may be done, for example, by extracting an identification number from the information and comparing the number to a list of valid identification numbers stored in a memory. If the computer 202 determines that the information contains a valid identification, it logs the user into the system 200. If the computer 202 determines that the information does not contain a valid identification, it denies the user access to the system 200 and displays, for example, an error message.

While the user is logged into the system 200, the computer 202 may periodically interrogate the identification component 12 to authenticate the user. The computer 202 may authenticate the user, for example, by interrogating the identification component 12 once every thirty seconds, once a minute, or once every five minutes. If the computer 202 does not detect a valid identification in response to the interrogation, it may automatically log the user out of the system 200. The computer 202 may also log a user out of the system 200 if the computer 202 detects an identification that does not correspond to a previous identification, indicating that a new user is accessing the system.

The frequency of interrogations may vary depending on the type of application the user is running on the computer 202. For example, if the user is running an application that gives the user access to sensitive information, the computer 202 may interrogate the identification component 12 every thirty seconds or less, whereas if the user is running an application that does not give the user access to sensitive information, the computer 202 may interrogate the identification component 12 every five minutes, or may not execute an interrogation at all until the user runs an application that gives the user access to sensitive information. The frequency of the interrogations may also decrease if several consecutive interrogations confirm that the same user is accessing the system.

The system 200 has been described as automatically logging the user into and out of the computer 202 as the user approaches and leaves the vicinity of the computer 202, but the system 200 may use other methods to provide secured access to the computer 202. If the user does not anticipate use of the computer 202 by more than one person, for example, the system 200 may simply lock the computer 202 without logging the user out when the user leaves the vicinity, and then unlock the computer 202 when the user returns to the vicinity. This method has the advantage of avoiding the potentially lengthy delays associated with logging a user into and out of the system 200 and/or a network.

The system 200 relies upon the assumption that only an authorized user is using the identification tag 10, because the system 200 only validates the tag 10, not the user. This may be adequate in some situations, such as, for example, where the information stored in the system 200 is not highly sensitive, where all users possess a security clearance, or where there is a small number of users. In an environment where there is a substantial risk of an unauthorized user accessing the system 200 by illicitly acquiring a tag 10, a system that associates a user with an identification tag may be employed, as explained below.

Another preferred embodiment of the present invention is illustrated in FIGS. 7-11 and provides a security system 250 used to prevent unauthorized access to a protected computer system, a pharmaceutical dispensing mechanism, or any other system or device for which authorization is required for access or control. The security system 250 broadly includes the identification tag 100, an identification tag registration device 302 used to associate the tag 100 with a particular user, and a processor or other computing device which communicates with the tag 100, the registration device 302 and the protected system or device.

Figure 7:
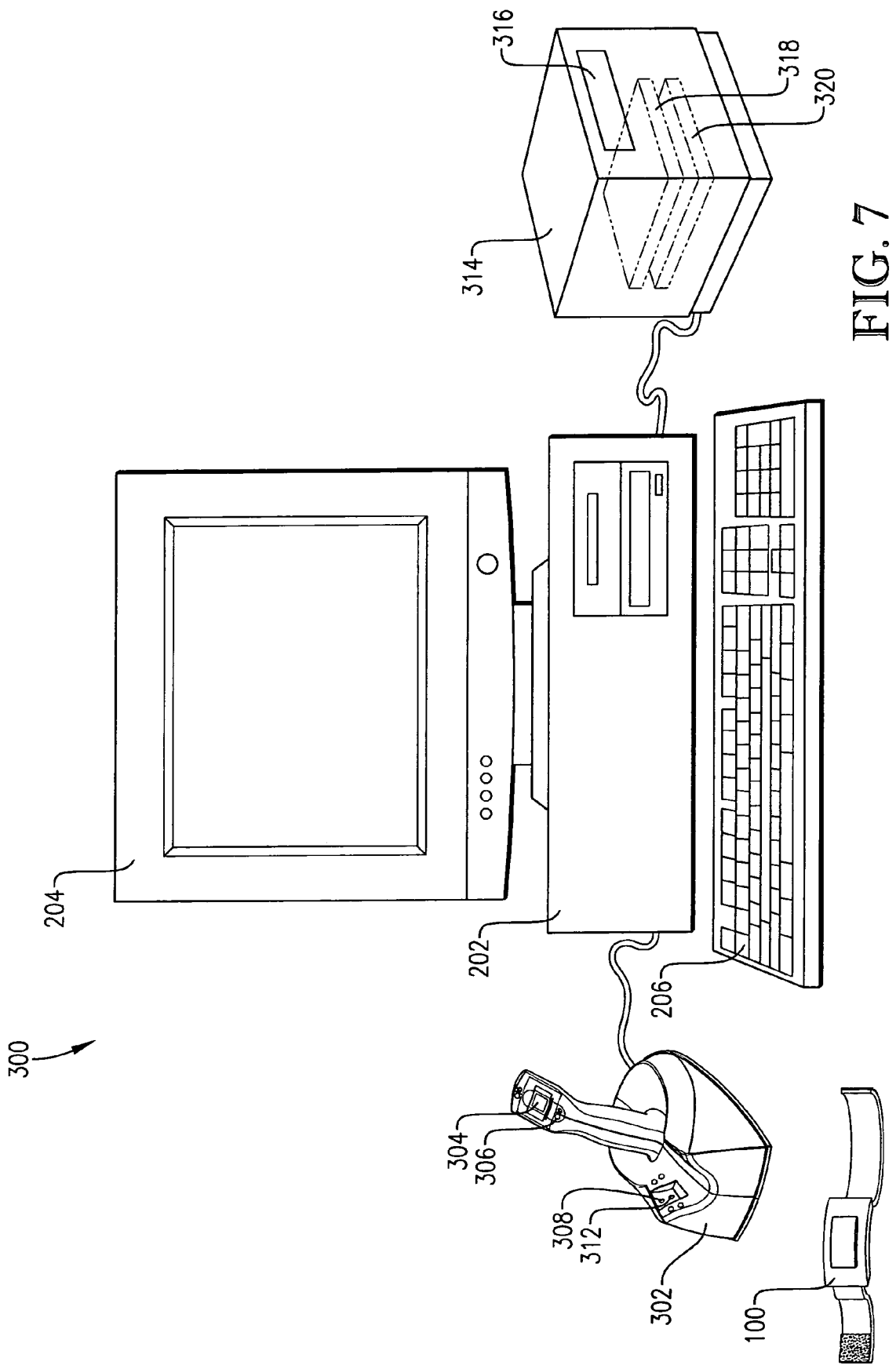
FIG. 7 is a perspective view of the RF identification tag of FIG. 4 used with another embodiment of the present invention.

Referring to FIG. 7, one implementation of the security system 250 includes a secured computer system 300. The computer system 300 is substantially similar to the computer system 200, except that the computer system 300 takes advantage of the tag identification and registration circuit 102 of the tag 100 by, for example, using the RF identification (RFID) tag registration device 302 to associate a user with a particular identification tag.

The system 300 comprises the host computer 202; the display 204; and the keyboard 206. One embodiment of the registration device 302 includes a fingerprint scanner 304, a finger pulse sensor 306, a local RF tag read/write component 308, wrist pulse sensor 310 and confirmation signal sensor 312; and an RF tag reader 314 including an antenna 316, a transmit power controller 318 and a receiver 320 all housed in or on a housing 321.

The RF identification tag registration device 302 generally scans physical information unique to the user and communicates the information to the computer 202, enabling the computer to verify that a valid user is wearing the tag and to associate the tag with the user. Referring also to FIGS. 8-11, the housing 321 of the illustrated tag registration device 302 includes a base 322 and a handle 324, wherein the base 322 includes a recess 326 in which the user's arm rests while the user grasps the handle 324. The fingerprint scanner 304 and the finger pulse sensor 306 are located near a top of the handle 324 so that a user's thumb easily and comfortably rests on the scanner 304 when the user grasps the handle 324. The local RF tag read/write component 308, the wrist pulse sensor 310 and the light sensor 312 are located on a side of the recess 326 to be proximate the tag 100 when the user's arm that is wearing the tag 100 is resting in the recess 326.

The fingerprint scanner generally acquires an image of the user's fingerprint and communicates the image to the system so that the system can verify that the user is authorized to use the system. The illustrated fingerprint scanner 304 is located near a top of the handle 324 so that when a user grasps the handle, the user's thumb naturally and comfortably rests on the scanner 304 with the thumbprint squarely on the scanner 304. The scanner 304 uses traditional methods known in the art to acquire an image of the thumbprint, such as optical scanning, capacitance scanning, or both. An optical scanner, for example, illuminates the ridges and valleys of a user's finger that form the fingerprint with an array of light emitting diodes (LEDs), and captures an image of the print with a charge coupled device (CCD). A CCD is simply an array of light-sensitive diodes called photosites, which generate an electrical signal in response to light photons. Each photosite records a "pixel," or a tiny dot representing the light that hit the photosite. Collectively, the light and dark pixels form an image of the fingerprint. Typically, an analog-to-digital converter in the scanner system processes the analog electrical signal to generate a digital representation of this image. The digital representation can then be communicated to the computer for processing. It will be appreciated that other biometric information sensors may be used in place of, or in addition to, the fingerprint scanner described herein. A retina scanner may be used to compliment or replace the fingerprint scanner, for example.

The finger pulse sensor and the wrist pulse sensor generally measure the user's pulse from the finger that contacts the fingerprint scanner and the user's wrist near the RF identification tag. The illustrated finger pulse sensor 306 is adjacent to the fingerprint scanner 304 and thus measures the user's pulse through the user's thumb in normal operation. The illustrated wrist pulse sensor 310 includes four sensor receptacles 328,330,332,334 that contact the user's wrist and sense the user's pulse. As illustrated, the sensor receptacles 328,330,332,334 are placed on either side of the read/write component 308. The system preferably requires a pulse to be sensed on each receptacle 328,330,332,334, but alternatively may require a pulse to be sensed on any one of the receptacles 328,330,332,334 or combination thereof. The finger pulse sensor 306 and the wrist pulse sensor 310 utilize pressure sensors and/or other sensors commonly used to measure human pulse, such as oximeters. Sensing the user's pulse at both the finger and the wrist enables the device 302 or system 300 to compare the two pulses to verify that the two are from the same person, thus preventing a first person from placing his finger on the thumbprint scanner while a second person places his wrist in the recess 326 of the base 322 of the registration device 302. The device 302 processes the fingerprint and pulse information using integrated circuits 336 and 338. Alternatively, the device 302 may communicate all or a portion of the fingerprint and pulse information to the computer 202 for processing.

The RF tag read/write component 308 is operable to read information from and write information to the passive RF identification component 12 of the RFID tag 100, and is further operable to receive affiliation information from the affiliation component 102 of the tag 100. The component 308 communicates this information to the computer 202 for processing, which is described above.

The confirmation signal sensor generally senses confirmation signals communicated by the confirmation signal generator of the RF identification tag to confirm the identification of the tag. The illustrated confirmation signal sensor 312 senses the confirmation signals generated by the confirmation signal generator 112 and therefore is an infrared sensor. For optimal security, it is preferable to design and/or place the confirmation signal sensor 312 so that the signal generator 112 must be in close proximity to the sensor 312 for communication to occur. This may be accomplished, for example, by limiting the sensitivity of the sensor 312. It will be appreciated that this reduces the risk of a first person placing his or her arm in the registration device 302 while another person registers a tag. It will be further appreciated that the confirmation signal sensor may take any form adapted to receive the confirmation signal.

To enable the computer to associate an RFID tag 100 with a particular user, the registration device 302 must scan physical information from only one hand and identification information from only one RFID tag 100 at a time. Use of the LED 112 of the tag circuit 102 and the LED sensor 312 prevent a first person from placing a finger on the fingerprint scanner 304 and a wrist in the recess 326 of the registration device 302 while a second person wears the tag 100 near the RF tag read/write component 308. In such a situation the LED sensor 312 does not detect the LED 112, and the registration device 302 does not register the user. To further avoid reading tags that are not in the registration device 302, the read/write component 308 may have a very short range, such as less than one inch, which forces the user to hold his or her wrist with the identification tag 100 very close to the read/write component 308. Furthermore, to ensure that the physical information is collected from the hand of the person wearing the identification tag 100, the registration device 302 is adapted to physically accommodate only one hand/wrist at a time when the physical information is read.

When the user grasps the handle 324, the user's lower arm with the tag 100 rests in the recess 326 of the base 322. The local RF tag read/write component 308 is located near a ridge of the recess 326 so that the circuit 102 of the tag 100 is near the read/write component 308. The read/write component 308 is preferably located on either side of the recess 326 to accommodate wearing the tag 100 on either arm. It will be appreciated that the shape of the handle 324 and base 322 makes proper use of the registration device 302 easy and comfortable while discouraging improper use of the registration device 302. It is impossible, for example, for two users to place their arms in the recess 326 simultaneously in an effort to circumvent system security by registering two tags.

The variable power RF tag reader 314 is operable to communicate with the identification tag 100 to receive identification information from the tag 100 and communicate that information to the host computer 202. The reader 314 communicates wirelessly with the tag 100, and is preferably peripheral to the host computer 202 as illustrated in FIG. 7. Incorporating the reader 314 into a peripheral device has the advantage of allowing the user to place the reader 314 in a position or location to optimize communications between the reader 314 and the host computer 202. Alternatively, the reader 314 may be integral with and/or internal to the computer 202.

The reader 314 reads identification information from the RFID tag 100 by first transmitting an electromagnetic interrogation signal, which the passive RF identification component 12 responds to, as described above. The RFID component 12 responds to the interrogation by transmitting a signal containing identification information. The reader 314 is adapted to receive the signal containing the identification information and communicate that signal to the host computer 202. The reader 314 is operable to isolate the RFID tag 100 of the user from other tags 100 in the vicinity. For example, the reader 314 is preferably adapted to transmit the interrogation signal at various power levels to enable the system 300 to isolate communication with the RFID tag 100 nearest the computer 202. This would be advantageous where several users with RFID tags 100 are in the vicinity of the computer 202, but only the user nearest the computer 202 is using the computer 202 and needs to be logged in.

While the RF tag registration device 302 and the RF tag reader 314 have been depicted as being communicatively coupled to the computer 202 via wires, it will be appreciated that either or both may communicate with the computer 202 via a wireless medium such as RF, infrared, or optical signals.

In use, a user wears the RFID tag 100 on a wrist while operating the computer 202. When the user approaches the computer 202, the computer 202 detects and validates identification information from the identification component 12 of the tag 100. When the computer 202 validates the information it may prompt the user to submit physical information via the registration device 302 by, for example, grasping the handle 324 of the registration device 302, placing a thumb on the fingerprint scanner 304 and resting the arm in the recess 326 of the base 322 of the registration device 302. The registration device 302 scans the physical information using the fingerprint scanner 304, interrogates the tag 100 with the RF tag read/write component 308 to acquire identification information, and communicates the physical information and the identification information to the computer 202. Additionally, the computer 202 may write information, such as an access code, to the tag 100 via the read/write component 308 of the registration device 302.

In order to submit physical information, the user must grasp the handle 324 of the registration device 302, place his or her thumb or finger on the fingerprint scanner 304, place his or her arm in the recess 326 of the base 322 of the registration device 302 and press the tag 100 against the local RF tag read/write component 308 and the confirmation signal sensor 312. This allows the registration device 302 to compare the finger pulse information with the wrist pulse information and allows the confirmation signal sensor to confirm that the tag 100 being read is worn by the user submitting physical information. It will be appreciated that these precautions reduce the risk of system security breaches. For example, if a first user attempts to place a thumb on the fingerprint scanner while a second user attempts to rest an arm in the recess 326 of the base 322, the registration device 302 will not read physical information because the finger pulse information will not match the wrist pulse information. Furthermore, if a first user grasps the handle 324 of the registration device 302 and rests an arm in the recess 326 of the base 322 while a second user holds the tag 100 near the local RF tag read/write component 308, the registration device 302 will not read the user's physical information because the confirmation signal sensor 312 will not have sensed the confirmation signal from the signal generator 112.

The computer 202 may validate the user information by, for example, comparing the user's fingerprint information with information stored in a database, and matching the user's information with database information. Upon receiving and validating the user physical information, the computer 202 associates the identification information from the tag 100 with the physical information by, for example, storing both in a memory. Associating the identification information with the physical information allows the computer 202 to authenticate the identification information by, for example, verifying that the identification information is associated with a valid user. This reduces the risk of an unauthorized user accessing the system 300 by illicitly acquiring an RFID tag 100.

To compare the user's fingerprint with a fingerprint stored in a database, the computer 202 may compare the entire fingerprint image with other images stored in a database or compare just part of the image with other images stored in a database. Comparing just part of the images can be performed much more quickly and requires less computer resources, such as memory and processor time. Furthermore, storing and using entire fingerprint images subjects the users to the risk of the images being stolen.

When comparing only parts of the fingerprint image, such systems compare only specific features of the fingerprint known as "minutiae." Such minutiae may include, for example, points where ridge lines terminate or bifurcate. Using algorithms known in the art, such systems compare the positions of minutiae of one image with the positions of the minutiae of a second image. If the two images have similar constellations of minutiae, for example, consisting of five ridge terminations and three bifurcations, it is likely that the images or of the same fingerprint. To match fingerprint images, the system does not have to match each and every minutiae point from each image but simply needs to find a sufficient number minutiae common to both images. The exact number varies according to the scanner programming, and may be varied by a user to increase or decrease the level of security.

While the user is logged into the system 300, the computer 202 may periodically interrogate the identification component 12 via the variable power RF tag reader 314 to authenticate the user. The system 300 is adapted to isolate communication with the tag 100 of the user accessing the computer 202 from others that may be in the vicinity. This may be done, for example, using the power controller 318 of the reader 314 to isolate communications with the user nearest the reader 314. To accomplish this, the reader 314 begins by transmitting an interrogation signal at a high transmit power level. The reader 314 then attempts to detect one or more radio signals containing identification information via the receiver 320. If the reader 314 detects only one response signal, it maintains the transmit power at the high level. If the reader 314 detects more than one response signal, the reader 314 may decrease the transmit power level by a small amount and transmit the interrogation signal again. If the reader 314 again detects more than one response signal, it will repeat the steps of decreasing transmit power and transmitting an interrogation signal at the lower power level.

This process allows the reader 314 to decrease the transmit power until the interrogation signal does not reach and/or activate tags 100 that are further from the reader 314 while still activating tags 100 that are closer to the reader 314. When the reader 314 has isolated communications with a single tag 100, that tag will be nearest the reader 314 and most likely the user of the computer 202. It will be appreciated that other methods of isolating the system user may be implemented with the present invention. When the user first submits physical information via the registration device 302, for example, the computer 202 may assign an access code to that user's tag 100 by writing the access code to the identification component 12 via the read/write component 308. The access code is then included in the identification information transmitted by the identification component 12, thus allowing the reader 314 to distinguish between various tags 100 that may be within the range of the reader 314.

The user affiliation component 202 of the RFID tag 100 may periodically communicate affiliation information to the computer 202, allowing the computer 202 to confirm or abandon the association of the identification information and the user physical information. The computer 202 may confirm the association if the affiliation information indicates that the tag 100 has not been removed from the user since the association was created. The computer 202 may abandon the association if the affiliation indicates that the tag 100 has been removed from the user since the association was created. If the computer 202 does not detect the identification information associated with the user physical information, it may automatically log the user out of the system 300. If the computer 202 detects a valid identification but abandons an association, it may log the user out of the system 300, or may prompt the user to submit user information to create a new association.

The user affiliation component 110 may automatically communicate affiliation information periodically, such as every thirty seconds, or may communicate the information in response to certain events. For example, the user affiliation component 110 may communicate affiliation information when the tag 100 has been removed from the user, when a new user attempts to access the system 300, or when the computer 202 solicits affiliation information.

The computer 202 may confirm or abandon an association without using the wrist affiliation component 110. This may be done, for example, by periodically prompting the user to submit user information via the registration device 302. If the user does not submit the information, or if the information indicates a new user is accessing the system 300, the computer 202 may log the user out of the system and/or log the new user into the system. Alternatively, the computer 202 may prompt the user to submit user information only if the user is running an application on the computer 202 that gives the user access to sensitive information.

While the tag 100 and the registration device 302 have been described and illustrated as useful to prevent unauthorized access to the computer system 300, it will be appreciated that the tag 100 and/or the registration device 302 are useful in many different environments that require secured access to a system or one or more devices. By way of example, the tag 100 and the registration device 302 may be used with an automated system that dispenses pharmaceuticals or other controlled-distribution products. Furthermore, the tag 100 and/or the registration device 302 may be used in an automated manufacturing system, wherein the tag 100 grants control of or access to manufacturing devices or systems located throughout a production site.

Referring to FIGS. 12-15, a pointer 400 is shown constructed in accordance with a third preferred embodiment of the present invention. The pointer 400 is adapted to facilitate use of a secured touch-screen computer system, does not impede other user functions such as typing, and is operable to communicate identification information to a computer. The computer may then use the information, for example, to log the user into and out of the computer system.

The pointer 400 comprises a stylus 402, an identification component 404, and an attachment component 406. The stylus 402 is adapted to assist the user in communicating with a computer via an interactive display, such as a touch screen or similar interface. The stylus 402 may be used with a touch screen, for example, that is part of a stand alone personal computer, part of a workstation that is connected to a computer network, or part of a portable device such as a personal digital assistant. The stylus 402 preferably is lightweight, sturdy, contains a fine point 408 for precise touch screen operation, and is adapted to be secured to the user in a comfortable manner for convenience and ease of use.

Figure 8:
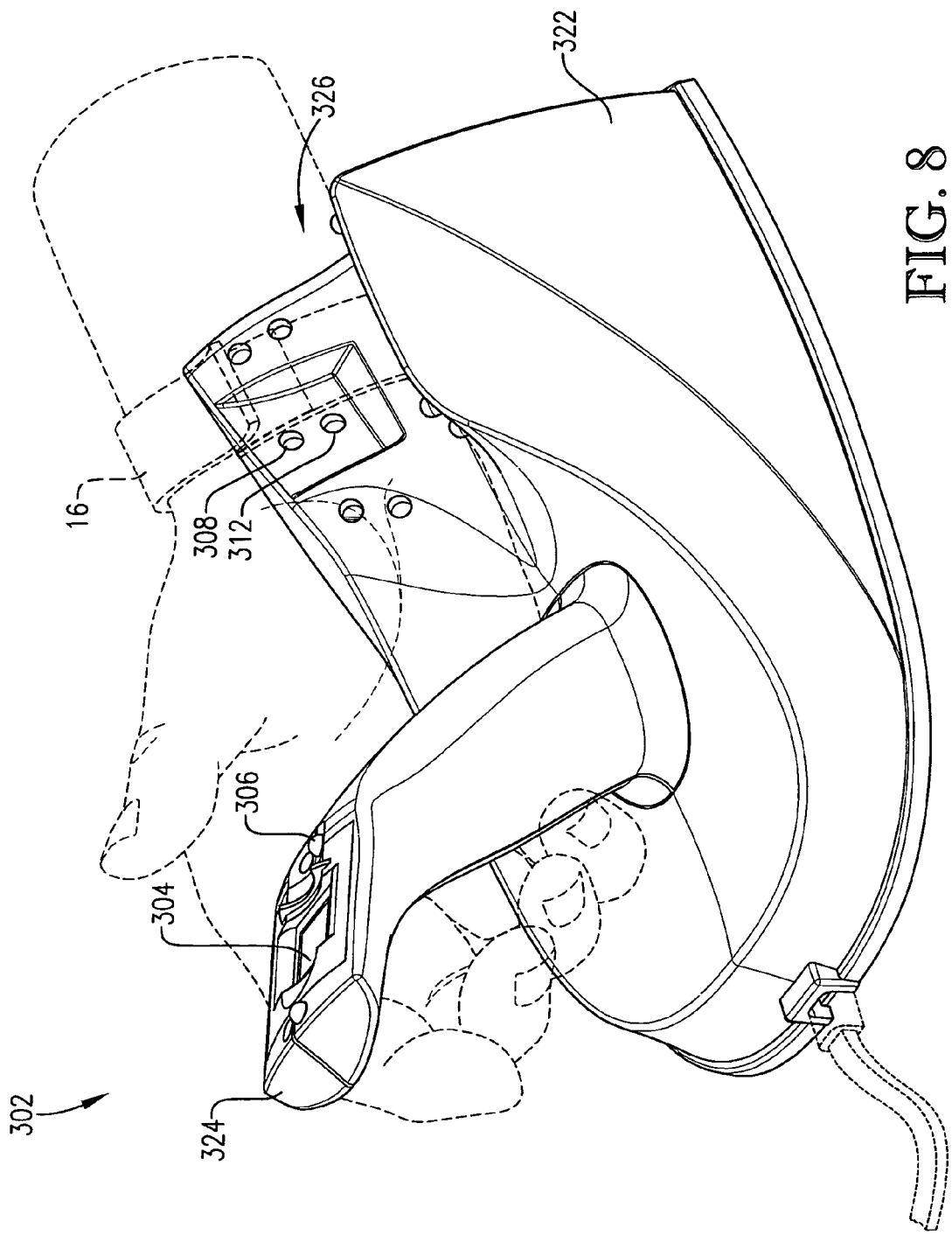
FIG. 8 is a perspective view of an RF identification tag registration device of the computer system of FIG. 7, illustrating a placement of a user's hand on the device.
Figure 9:
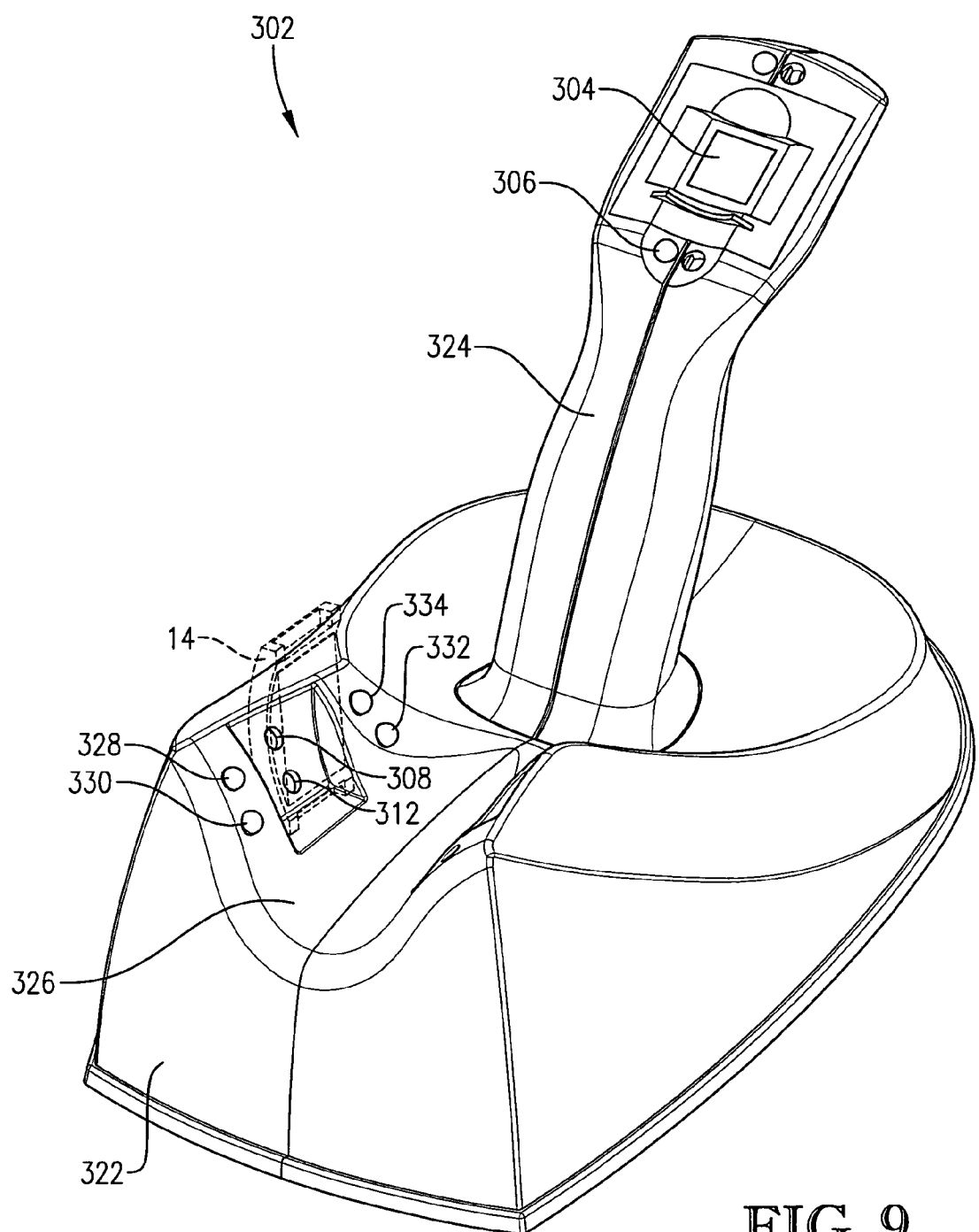
FIG. 9 is a perspective view of the RF identification tag registration device of FIG. 8.
Figure 10:
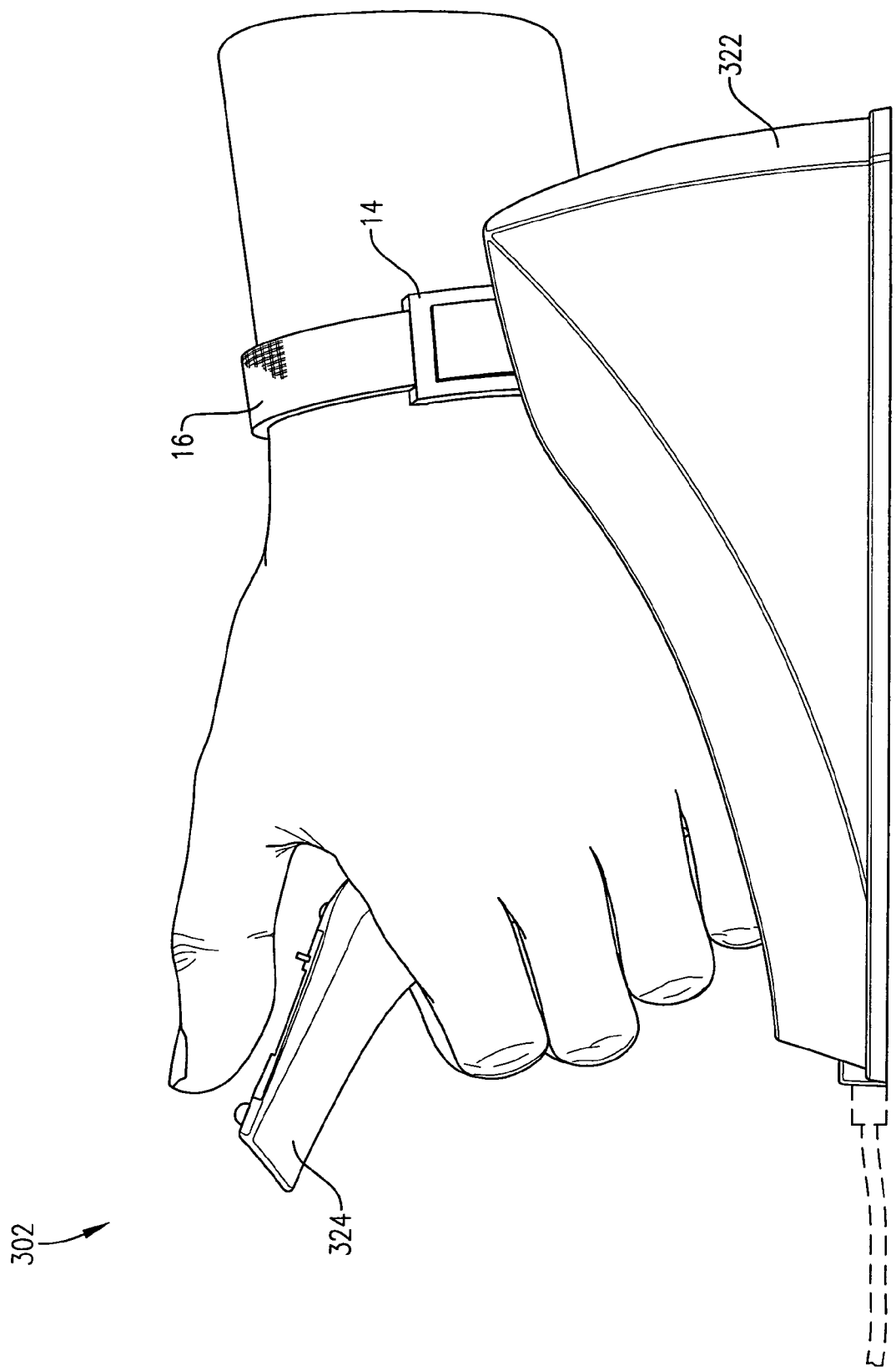
FIG. 10 is a side elevation view of the RF identification tag registration device of FIG. 8, illustrating a placement of a user's hand on the device.
Figure 11:
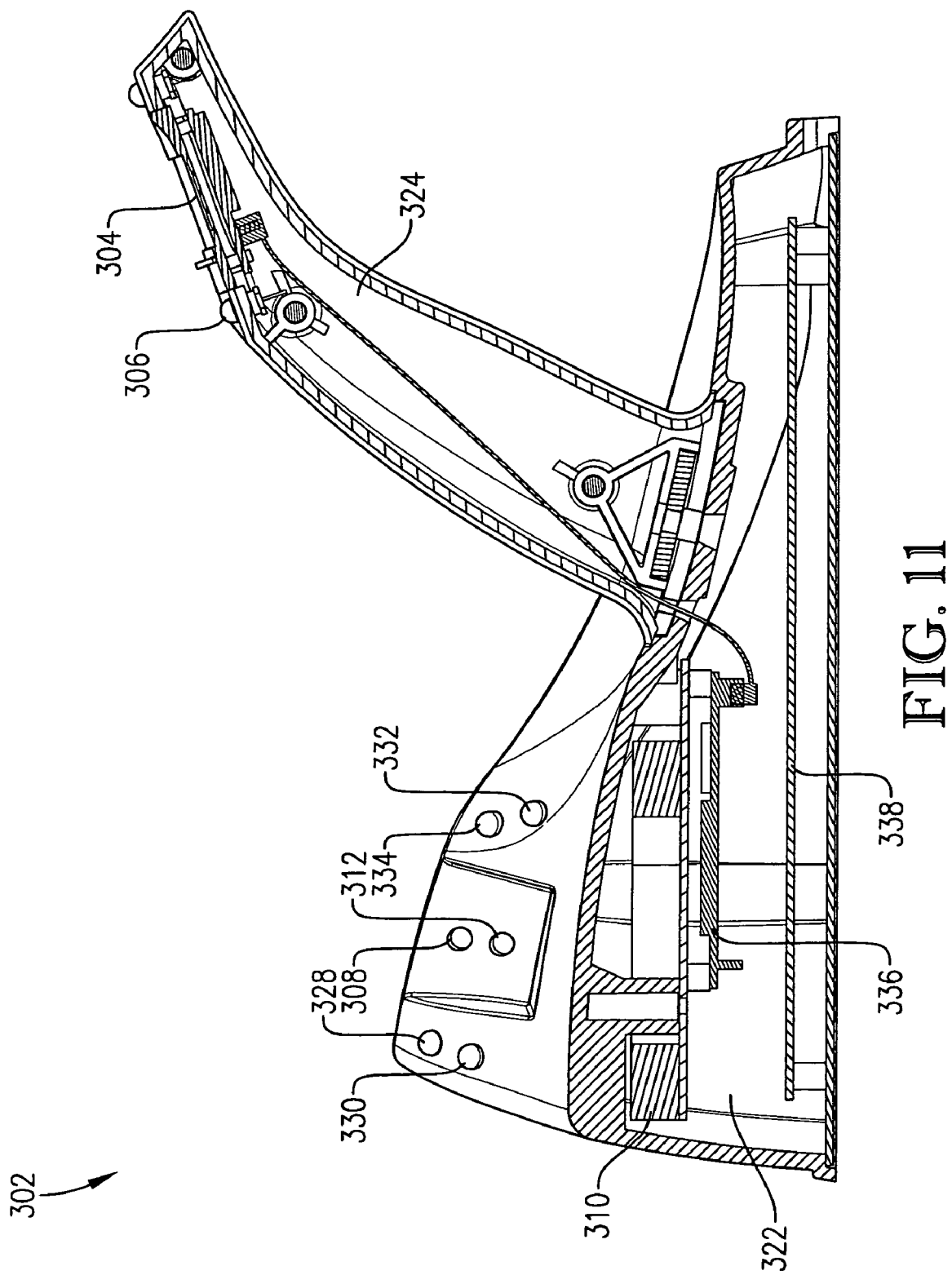
FIG. 11 is a side sectional view of the RF identification tag registration device of FIG. 8.
Figure 13:
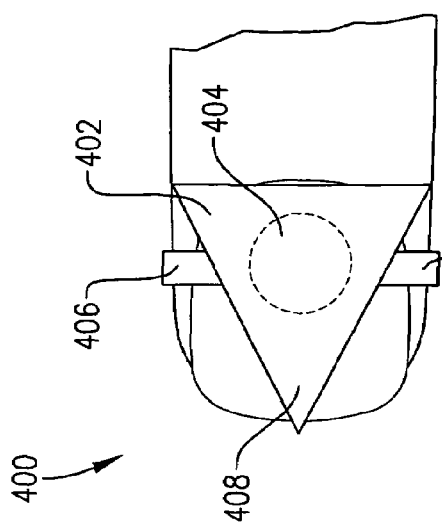
FIG. 13 is a top view of the pointer of FIG. 12 secured to a user's finger.
Figure 14:
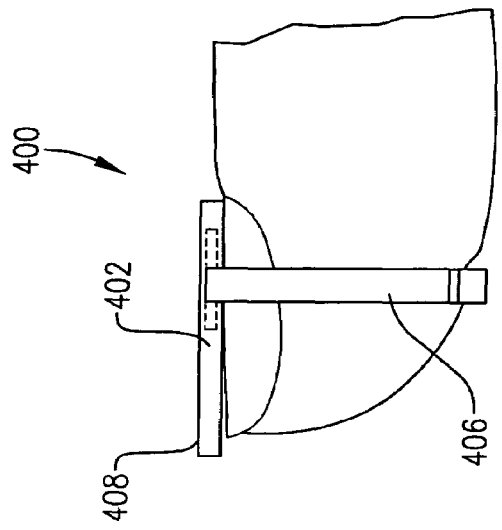
FIG. 14 is a side view of the pointer of FIG. 12 secured to a user's finger.
Figure 12:
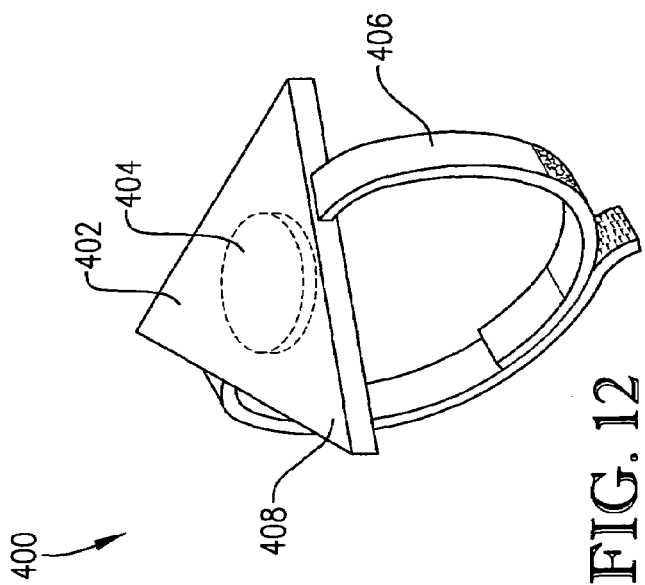
FIG. 12 is a perspective view of a pointer of another embodiment of the present invention.

The stylus 402 is preferably constructed of plastic or other suitable material such as aluminum, wood or nylon; is substantially triangle-shaped; and is sized to fit substantially over a user's fingernail with the point 408 extending minimally over the tip of the user's finger, as illustrated in FIGS. 8 and 9. The user interacts with the display using the point 408. Placing the stylus 402 over the user's fingernail allows the user to wear and use the pointer 400 without impeding use of the hand, as explained below. Although shown and described as being triangle-shaped, the stylus 402 may be of different shapes, such as, for example, a rectangle, oval, or rod. Furthermore, the stylus 402 may be adapted to be secured to body parts other than a finger, such as a wrist or arm; or to a user's clothing, such as a shirt sleeve or glove.

The identification component 404 is preferably adapted to be embedded in or attached to the stylus 402, but may alternatively be positioned remotely from the stylus 402. It may be desirable, for example, to secure the identification component 404 to the user in a manner that facilitates wireless communication with a computer, such as by securing the identification component 404 to the user's shirt. The identification component 404 may be any device operable to store and communicate identification information, such as an RFID tag or chip, as described below. The identification component 404 may include a memory element operable to receive and store the identification information, such as a read only memory (ROM), a programmable read only memory (PROM), or an erasable programmable read only memory (EPROM). A manufacturer may store the identification information in the identification component 404 by programming the ROM at the time the pointer 400 is manufactured, or an end user may program or reprogram the ROM.

The attachment component 406 is adapted to secure the stylus 402 to a user. In one embodiment, the attachment component 406 includes a flexible strap adapted to wrap around the user's finger, secured in place with a hook and loop fastener, such the VELCRO® brand hook and loop fastener. The attachment component 406 preferably secures the stylus 402 to the user's finger so that the stylus 402 is located substantially over the user's fingernail, with the point 408 extending over the tip of the fingernail with minimal overhang, as illustrated in FIGS. 8 and 9. The attachment component 406 preferably does not impede use of the user's hand or finger when worn, and leaves exposed a fingerprintable portion of the user's fingertip, allowing the user to type, use a pen, use a fingerprint scanner, talk on a telephone, wear a glove, and perform other tasks without removing the pointer 400. This has the advantage of allowing a user to efficiently use a computer system that includes both a keyboard and a touch screen by enabling the user to type while wearing the pointer 400. The user could quickly alternate between using the keyboard and the touch screen, and may even use the keyboard and the touch screen simultaneously.

The attachment component 406 is not limited to a flexible strap but may include, for example, an elastic band, or substantially rigid members that partially or completely encircle the user's finger. Also, the attachment component 406 may secure the stylus 402 and the identification component 404 to various areas of the user's body or clothes, such as a wrist, arm, shirt or glove; and may secure the stylus 402 and the identification component 404 to separate parts of the body. For example, the attachment component 406 may include two portions, wherein a first portion secures the stylus 402 the user's finger and a second portion secures the identification component 404 the user's wrist.

Referring to FIG. 16, a screen pointer 500 is shown constructed in accordance with an alternate embodiment of the present invention. The pointer 500 is substantially similar to the pointer 400, except that it further includes an affiliation component 310 operable to detect if the pointer 500 is secured to a user and to communicate corresponding information to allow a computer to associate the pointer 300 with a particular user, and is thus similar to the RFID tag affiliation component 404 described above.

Referring to FIG. 17, the pointer 400 is preferably used to provide access to computer system 600. The computer system 600 may be substantially similar to the computer systems described above, with the exception that the display 602 is operable to display information generated by the computer 202 and respond to contact with the pointer 400. The display 602 may be, for example, a touch screen of a type that is well known in the art, and may include a cathode ray tube or a liquid crystal display. The keyboard 206 is operable to allow the user to input text and other commands to the computer, and may be of a type that is well known in the art. The display 602 and the keyboard 206 may take any of a variety of forms. For example, if the computer 202 is embedded in a vehicle, the display 204 may include a small liquid crystal display (LCD) touch screen embedded in the vehicle's dash board, and the keyboard 206 may include only a few buttons located on the dash board or steering wheel.

In use, a user wears the pointer 400 on a finger or other area of the body while operating the computer 202. When the user approaches the computer 202, the computer 202 interrogates the identification component 404 and detects the identification information from the identification component 404, as described above in relation to the first preferred embodiment of the present invention. When the computer 202 logs a user into the system, the user may use the pointer 400 to interact with the computer 202 via the display 602, may interact with the computer via the keyboard 206, or both. For example, the user may use the keyboard 206 to enter text, and use the pointer 400 to navigate menus shown on the display 602 by touching the stylus 400 to a menu item. This system would eliminate the need for a mouse or other screen navigation device.

Figure 18:
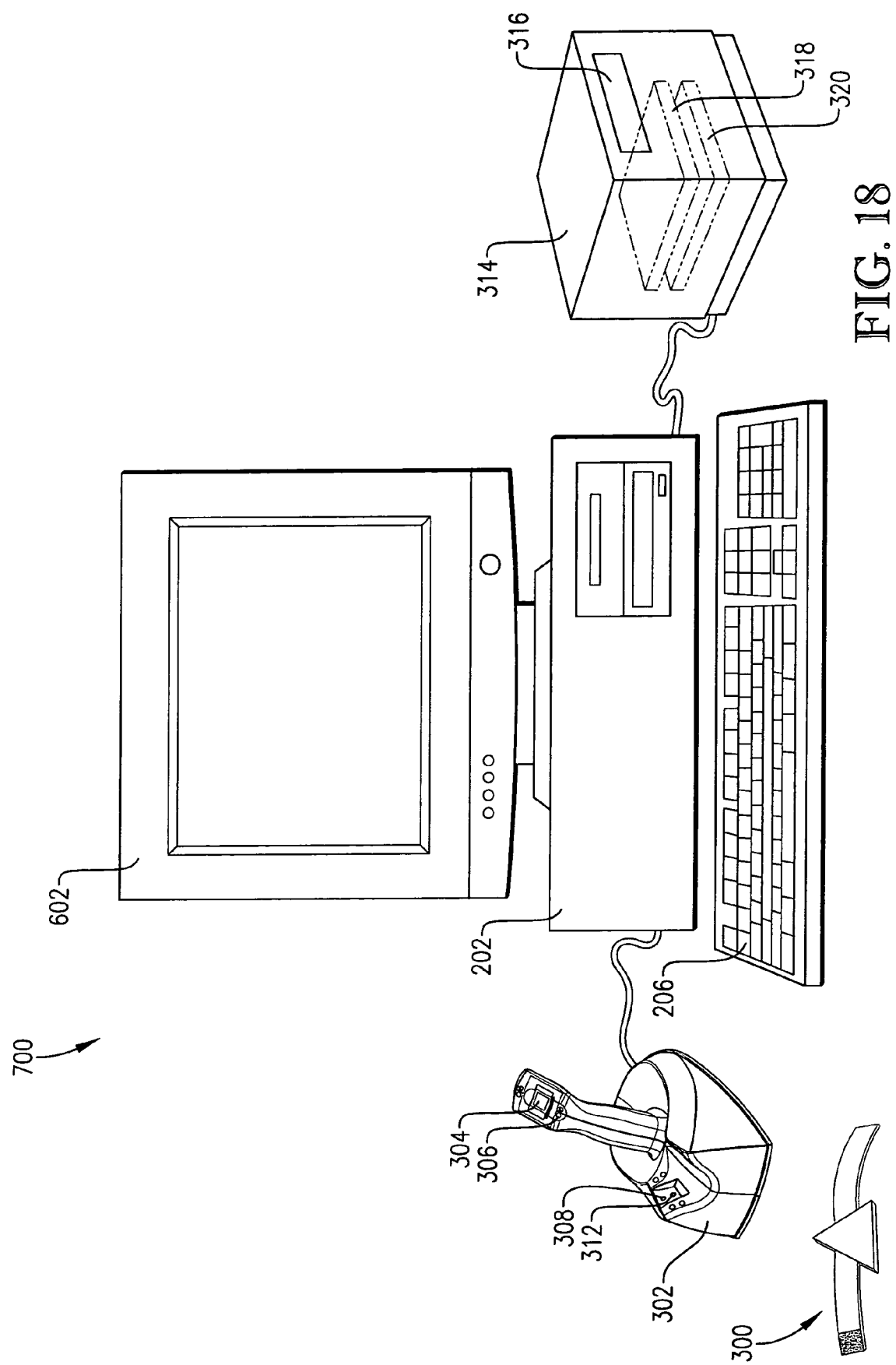
FIG. 18 is a perspective view of a computer system using the pointer of FIG. 16.

Referring to FIG. 18, the pointer 500 may be used as part of a computer system 700. The pointer 500 is substantially similar to the pointer 400, except that the pointer 500 includes an affiliation component 502, as explained above. The computer system 700 may be substantially similar to the computer system 600 described above. The registration device 302 is operable to acquire user information and communicate the information to the computer 202. As with the system 600 described above, the affiliation component 310 allows the computer to associate the identification information with user physical information and require that association to be valid before granting a user access to the system 700.

In use, a user wears the pointer 500 on a finger or other area of the body while operating the computer 202. When the user approaches the computer 202, the computer 202 detects and validates identification information from the identification component 404. When the computer 202 validates the identification information, it may prompt the user to submit user physical information via the registration device 302 by, for example, requiring the user to place a finger on a fingerprint scanner 304 and a finger pulse sensor 306. The computer 202 may validate the physical information by, for example, comparing the user's fingerprint information with fingerprint information stored in a database, and matching the user's information with information in the database. Upon receiving and validating the physical information, the computer 202 associates the identification information with the user information by, for example, storing both in a memory. Associating the identification information with the user information allows the computer 202 to authenticate the user using identification information, as well as verify that the identification information is associated with a valid user. This reduces the risk of an unauthorized user accessing the system 350 by illicitly acquiring a pointer 500.

It will appreciated that while the system 300 is similar to the system 200, the system 300 may be adapted to accommodate use of the pointer 300. The RF tag read/write component 308, for example, may be located near or in the fingerprint scanner 304 in order to facilitate simultaneously scanning a fingerprint and interrogating the identification component 404.

The present invention has several advantages over the prior art. It allows a user to work with a secured computer system more efficiently because it eliminates the need for a user to manually log into and out of the system. The present invention also increases the security of such a system by eliminating the risk of a user inadvertently forgetting to log out of the system and leaving it open to unauthorized access. Furthermore, the third preferred embodiment of the present invention eliminates the need for a mouse or other screen navigation device, and allows for simultaneous use of a keyboard and touch screen.

Although the invention has been described with reference to the preferred embodiments illustrated in the attached drawings, it is noted that equivalents may be employed and substitutions made herein without departing from the scope of the invention as recited in the claims. It will be appreciated, for example, that the identification component 30 and the affiliation component 100 may be operable to encode their respective communications.

Having thus described the preferred embodiment of the invention, what is claimed as new and desired to be protected by Letters Patent includes the following:

1. A device for registering an identification tag, the device comprising:
   a fingerprint scanner for acquiring fingerprint information from a user wearing the tag;
   an identification tag read/write component for writing identification information to the tag and reading the identification information from the tag;
   a first pulse sensor for acquiring pulse information from a first location on the user's arm, the first pulse sensor including a finger pulse sensor for acquiring pulse information from the user's finger;
   a second pulse sensor for acquiring pulse information from a second location on the user's arm, the second pulse sensor including a wrist pulse sensor for acquiring pulse information from the user's wrist; and
   a communications component for communicating the pulse information from the first pulse sensor and the pulse information from the second pulse sensor to an external electronic device, wherein the communications component includes a processor for comparing the pulse information obtained from the wrist pulse sensor with the pulse information obtained from the finger pulse sensor and communicating the identification information and the fingerprint information to the external device if the pulse information obtained from the wrist pulse sensor corresponds to the pulse information obtained from the finger pulse sensor.

2. The device as set forth in claim 1, further comprising a confirmation signal sensor for sensing a confirmation signal generated by the identification tag.

3. The device as set forth in claim 2, wherein the communications component communicates the biometric information and the identification information to the external device if the confirmation signal received by the confirmation sensor is valid.

4. The device as set forth in claim 1, wherein the read/write component communicates with the tag via a wireless RF signal.

5. The device as set forth in claim 1, wherein the read/write component communicates with the tag via an infrared signal.

6. An RF identification tag registration device comprising:
   a housing including a base and a handle;
   a fingerprint scanner positioned on the handle for receiving a user's finger, acquiring user fingerprint information, and communicating the fingerprint information;
   a finger pulse sensor integral with the fingerprint scanner for acquiring pulse information from the user's finger;
   a plurality of wrist pulse sensors located in the base for acquiring pulse information from the user's wrist;
   a confirmation signal sensor located proximate the wrist pulse sensors for sensing a confirmation signal generated by an RFID tag;
   an RF tag read/write component located proximate the wrist pulse sensors for writing identification information to the RF tag by communicating an RF signal and for reading identification information from the RF tag; and
   a processor for comparing the pulse information obtained from the wrist pulse sensor with the pulse information obtained from the finger pulse sensor and communicating the identification information and the fingerprint information to an external device if the pulse information obtained from the wrist pulse sensor corresponds to the pulse information obtained from the finger pulse sensor and the confirmation signals reflect the RF signal.

7. A computer user verification system comprising:
   an identification tag for communicating identification information, the tag including
      an identification component for storing and communicating identification information, and
      a confirmation signal source for communicating a confirmation signal; and
   an identification tag registration device for registering the tag, the device including
      a biometric information sensor for acquiring biometric information from a user using the tag,
      a confirmation signal sensor for sensing the confirmation signal of the identification tag,
      a first pulse sensor for acquiring pulse information from a first location on the user's arm,
      a second pulse sensor for acquiring pulse information from a second location on the user's arm, and
      a processor for comparing the pulse information from the first location with the pulse information from the second location and communicating the biometric information to an external device if the pulse information from the first location corresponds to the pulse information from the second location.

8. The system as set forth in claim 7, the identification component including a passive RF circuit for communicating the identification information in a radio signal in response to an interrogation signal.

9. The system as set forth in claim 7, wherein the identification information includes the user's name.

10. The system as set forth in claim 7, wherein the identification information includes an identification number.

11. The system as set forth in claim 7, the identification tag further including an affiliation component for detecting when the tag is secured to the user and for communicating affiliation information.

12. The system as set forth in claim 11, wherein the affiliation information indicates whether the tag is secured to the user.

13. The system as set forth in claim 12, wherein the affiliation component detects when the tag is secured to the user by measuring a capacitance between two points of a surface of the tag that is in contact with the user's skin.

14. The system as set forth in claim 13, wherein the affiliation component detects when the tag is secured to the user by sensing light incident to the surface of the tag.

15. The system as set forth in claim 12, wherein the affiliation component detects when the tag is secured to the user by measuring a pressure exerted on the surface of the tag.

16. The system as set forth in claim 12, wherein the affiliation component detects when the tag is secured to the user by measuring a temperature of the surface of the tag.

17. The system as set forth in claim 7, further including an attachment component for securing the tag to the user's wrist.

18. The system as set forth in claim 7, wherein the confirmation signal source is a light-emitting diode.

19. The system as set forth in claim 18, wherein the light-emitting diode emits an infrared signal.

20. The system as set forth in claim 7, further comprising a battery for storing energy and communicating the energy to another component of the tag.

21. The system as set forth in claim 20, further comprising a battery charger, wherein the charger stores energy in the battery by receiving energy from an antenna and delivering the energy to the battery.

22. The system as set forth in claim 7, wherein the biometric information sensor is a retina scanner for acquiring retina information.

23. The system as set forth in claim 7, wherein the biometric information sensor is a fingerprint scanner for acquiring fingerprint information.

24. The system as set forth in claim 7, wherein the first pulse sensor includes a finger pulse sensor for acquiring pulse information from the user's finger.

25. The system as set forth in claim 24, wherein the second pulse sensor includes a wrist pulse sensor for acquiring pulse information from the user's wrist.

26. The system as set forth in claim 7, wherein the processor communicates the biometric information to the external device if the confirmation signal received by the confirmation signal sensor is valid.

27. The system as set forth in claim 7, wherein the identification tag registration device further includes an identification tag read/write component for writing the identification information to the tag and reading the identification information from the tag.

28. The system as set forth in claim 27, wherein the read/write component communicates with the tag via an RF signal.

29. The system as set forth in claim 27, wherein the read/write component communicates with the tag via an infrared signal.

30. A user verification system for allowing a user to access a secured system or location, the user verification system comprising:
 a tag for communicating identification information;
 a registration device for acquiring a user's biometric information and for communicating the biometric information, the registration device including
  a fingerprint scanner for acquiring fingerprint information relating to the user's fingerprint and communicating the fingerprint information to a computer,
  a finger pulse sensor, and
  a wrist pulse sensor,
  wherein the registration device communicates the fingerprint information only if pulse information obtained from the finger pulse sensor corresponds to pulse information obtained from the wrist pulse sensor; and
 a computer operable to receive the identification information and the biometric information communicated from the tag and the registration device, respectively, and for validating the identification information and the biometric information, for permitting the user to access the secured system or location if the identification information and the biometric information are validated, and for denying the user access to the secured system or location if the identification information and the biometric information are not validated.

31. The system as set forth in claim 30, wherein the tag is a wrist tag.

32. The system as set forth in claim 31, wherein the tag further includes an affiliation component for detecting when the tag is secured to the user's wrist and for communicating affiliation information.

33. The system as set forth in claim 32, wherein the computer associates the identification information with the biometric information, confirms the association using the affiliation information, and if the association is confirmed, permits the user to access the secured system or location.

34. The system as set forth in claim 32, wherein the computer associates the identification information with the biometric information, abandons the association using the affiliation information, and if the association is abandoned, denies the user access to the secured system or location.

35. The system as set forth in claim 30, wherein the fingerprint scanner detects when the user's fingertip is present.

36. The system as set forth in claim 30, wherein the registration device further comprises an RF tag read/write component for writing the identification information to an RF identification component and for reading identification information from the RF identification component, wherein the read/write component is located proximate the wrist pulse sensor.

37. The system as set forth in claim 36, wherein the tag further includes a confirmation signal generator and the registration device further includes a confirmation signal sensor located proximate the wrist pulse sensor, and the registration device communicates the fingerprint information only if the confirmation signal sensor senses a confirmation signal from the signal generator.

38. The system as set forth in claim 36, further comprising an RF tag reader for interrogating the RF identification component by transmitting an RF interrogation signal and receiving the radio signal from the RF identification component.

39. The system as set forth in claim 38, wherein the RF tag reader isolates communication with the user by decreasing a transmit power if the reader receives signals from more than one identification component.

40. A user verification system for allowing a user to access a secured system or location, the user verification system comprising:
- a wrist tag for communicating identification information, the tag including
  - an affiliation component for detecting whether the wrist tag is secured to the user's wrist and for communicating affiliation information,
  - a passive RF identification component embedded in the wrist tag for responding to an interrogation signal by transmitting a radio signal containing the identification information,
  - a confirmation signal generator for generating a signal to confirm the identity of the tag, and
  - an attachment component for containing the affiliation component, the identification component, and the confirmation signal generator and for securing each to the user's wrist;
- a registration device for acquiring the user's biometric information and for communicating the information, the device including
  - a finger pulse sensor for acquiring pulse information from the user's finger,
  - a wrist pulse sensor for acquiring pulse information from the user's wrist,
  - a confirmation signal sensor for receiving the signal from the confirmation signal generator, wherein the confirmation signal sensor is located proximate the wrist pulse sensor,
  - an RF tag read/write component for writing identification information to the RF identification component and reading identification information from the identification component, wherein the read/write component is located near the wrist pulse sensor, and
  - a fingerprint scanner for receiving the user's fingertip, detecting when the fingertip is present, acquiring the user's fingerprint information, and communicating the information if the pulse information obtained from the finger pulse sensor corresponds to the pulse information obtained from the wrist pulse sensor and the confirmation signal reflects the signal from the read/write component;
- a variable power RF tag reader for interrogating the passive RF identification component in the wrist tag by transmitting an RF interrogation signal and receiving the radio signal from the RF identification component, for isolating communication with the user by decreasing a transmit power if the reader receives signals from more than one identification component, and for communicating the identification information; and
- a computer operable to receive the identification information and the biometric information communicated from the wrist tag and the registration device, respectively, and for validating the identification information, the affiliation information, and the fingerprint information, for associating the identification information with the fingerprint information, for confirming the association if the affiliation information indicates the wrist tag is secured to the user's wrist, for abandoning the association if the affiliation information indicates the wrist tag is not secured to the user's wrist, for permitting the user to access the secured system or location if the association is confirmed, and for denying the user access to the secured system or location if the association is abandoned.

\* \* \* \* \*